(12) United States Patent
Kawanishi et al.

(10) Patent No.: US 10,322,483 B2
(45) Date of Patent: Jun. 18, 2019

(54) TOOL SHAPE MEASUREMENT DEVICE AND TOOL SHAPE MEASUREMENT METHOD

(71) Applicant: Mitsubishi Electric Corporation, Tokyo (JP)

(72) Inventors: Ryosuke Kawanishi, Tokyo (JP); Yukiyasu Domae, Tokyo (JP); Shintaro Watanabe, Tokyo (JP); Nobuyuki Takahashi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 213 days.

(21) Appl. No.: 15/108,604

(22) PCT Filed: Jan. 24, 2014

(86) PCT No.: PCT/JP2014/051566
§ 371 (c)(1),
(2) Date: Jun. 28, 2016

(87) PCT Pub. No.: WO2015/111200
PCT Pub. Date: Jul. 30, 2015

(65) Prior Publication Data
US 2016/0318145 A1    Nov. 3, 2016

(51) Int. Cl.
*G06T 7/00* (2017.01)
*B23Q 17/24* (2006.01)
(Continued)

(52) U.S. Cl.
CPC ..... *B23Q 17/2466* (2013.01); *B23Q 17/2409* (2013.01); *B23Q 17/2461* (2013.01);
(Continued)

(58) Field of Classification Search
CPC ........... B23Q 17/2466; B23Q 17/2409; B23Q 17/2461; B23Q 3/15724; B23Q 3/15546; G01B 11/08; Y10T 483/12; Y10T 483/136
See application file for complete search history.

(56) References Cited

U.S. PATENT DOCUMENTS 5,988,862 A * 11/1999 Kacyra ............... G01B 11/002
 382/195
8,416,913 B2 * 4/2013 Akino ................. G06T 11/005
 378/4
(Continued)

FOREIGN PATENT DOCUMENTS

JP    62-152646 A    7/1987
JP     3-43134 A    2/1991
(Continued)

OTHER PUBLICATIONS

International Search Report for PCT/JP2014/051566 dated Mar. 4, 2014.

*Primary Examiner* — Mohamed Charioui
*Assistant Examiner* — Brandon J Becker
(74) *Attorney, Agent, or Firm* — Sughrue Mion, PLLC; Richard C. Turner

(57) ABSTRACT

A tool shape measurement device includes: a contour detection unit that detects a tool contour from an image of a rotating tool that is taken; an axis direction calculation unit that calculates a tool axis direction that is an axis direction of the rotating tool on the basis of the tool contour; a tool diameter measurement unit that calculates an apparent tool diameter of the rotating tool on an imaging surface on the basis of a calibrated positional and postural relationship between an imaging device and the rotating tool, the tool axis direction, and the tool contour; and a tool diameter correction unit that calculates a distance between the imag-
(Continued)

ing device and the rotating tool using the tool axis direction, and corrects the apparent tool diameter to an actual tool diameter by correcting distortion in the tool contour on the basis of the distance.

19 Claims, 16 Drawing Sheets

(51) Int. Cl.
B23Q 3/155 (2006.01)
B23Q 3/157 (2006.01)
G01B 11/08 (2006.01)
G01B 11/24 (2006.01)

(52) U.S. Cl.
CPC ............. *G01B 11/08* (2013.01); *G01B 11/24* (2013.01); *G06T 7/0004* (2013.01); *B23Q 3/15546* (2013.01); *B23Q 3/15724* (2016.11); *G06T 2207/30164* (2013.01); *Y10T 483/12* (2015.01); *Y10T 483/136* (2015.01)

(56) References Cited

U.S. PATENT DOCUMENTS

| | | | | |
|---|---|---|---|---|
| 2007/0070207 | A1* | 3/2007 | Sakurai | H04N 5/2251 348/207.99 |
| 2008/0184579 | A1* | 8/2008 | McFarland | G01B 21/04 33/551 |
| 2009/0100900 | A1* | 4/2009 | Spalding | G01B 11/08 73/1.81 |
| 2009/0101851 | A1* | 4/2009 | Spalding | G01B 11/2425 250/559.12 |
| 2009/0103107 | A1* | 4/2009 | Nygaard | G01B 11/026 356/602 |
| 2010/0073687 | A1* | 3/2010 | Spalding | G01B 11/2425 356/625 |
| 2010/0198553 | A1* | 8/2010 | Lee | G01B 5/08 702/157 |
| 2010/0245850 | A1* | 9/2010 | Lee | F42B 35/02 356/625 |
| 2011/0025876 | A1* | 2/2011 | Denzler | G06K 9/00 348/222.1 |
| 2013/0208286 | A1* | 8/2013 | Kurahashi | B23Q 17/2409 356/601 |
| 2013/0258046 | A1* | 10/2013 | Nygaard | G06T 7/0004 348/36 |
| 2013/0301056 | A1* | 11/2013 | Parks | G01B 9/02058 356/486 |
| 2014/0001665 | A1* | 1/2014 | Kato | B29D 99/0089 264/40.1 |
| 2014/0148939 | A1* | 5/2014 | Nakano | G01B 11/2545 700/166 |

FOREIGN PATENT DOCUMENTS

| | | |
|---|---|---|
| JP | 6-109440 A | 4/1994 |
| JP | 6-137842 A | 5/1994 |
| JP | 8-267343 A | 10/1996 |
| JP | 2000-74644 A | 3/2000 |
| JP | 2001-30143 A | 2/2001 |
| JP | 2006-284531 A | 10/2006 |
| JP | 2006-289513 A | 10/2006 |
| JP | 2007-185771 A | 7/2007 |
| JP | 2008-210179 A | 9/2008 |
| JP | 2010-19559 A | 1/2010 |
| JP | 2012-93262 A | 5/2012 |
| JP | 2012-168186 A | 9/2012 |

* cited by examiner

FIG.1
(a)
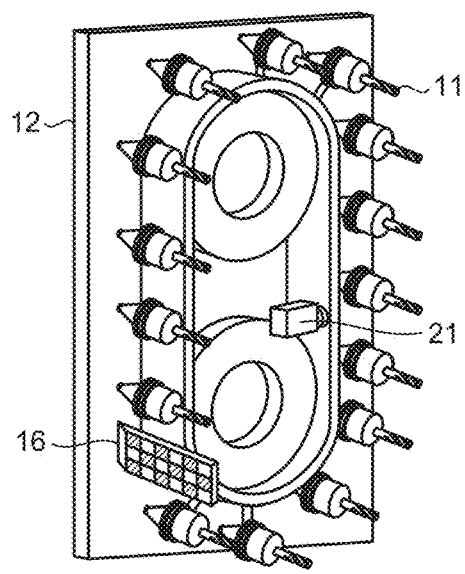
(b)
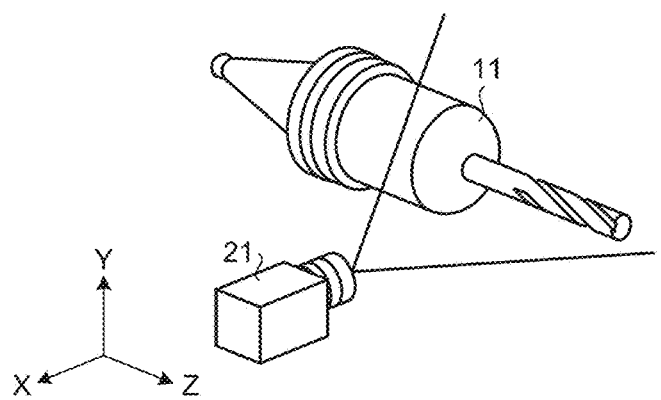
(c)
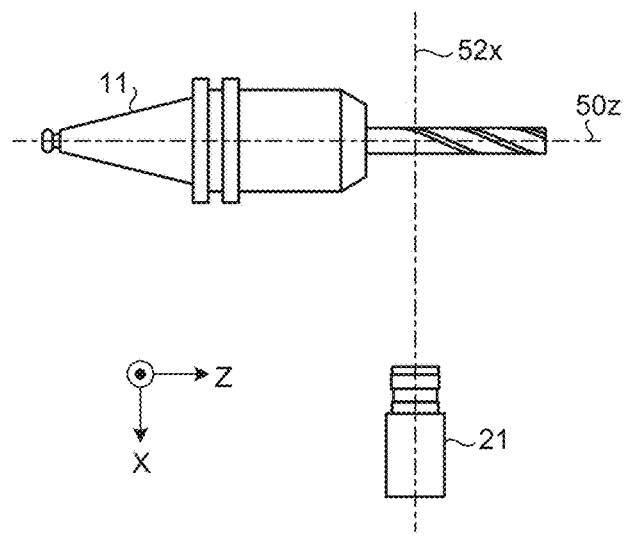

FIG.4
(a)
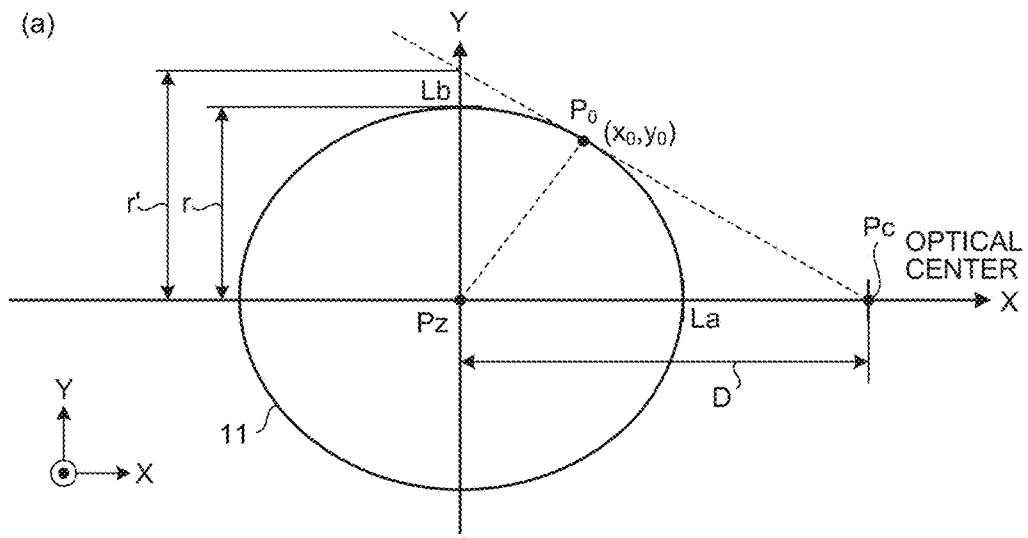
(b)
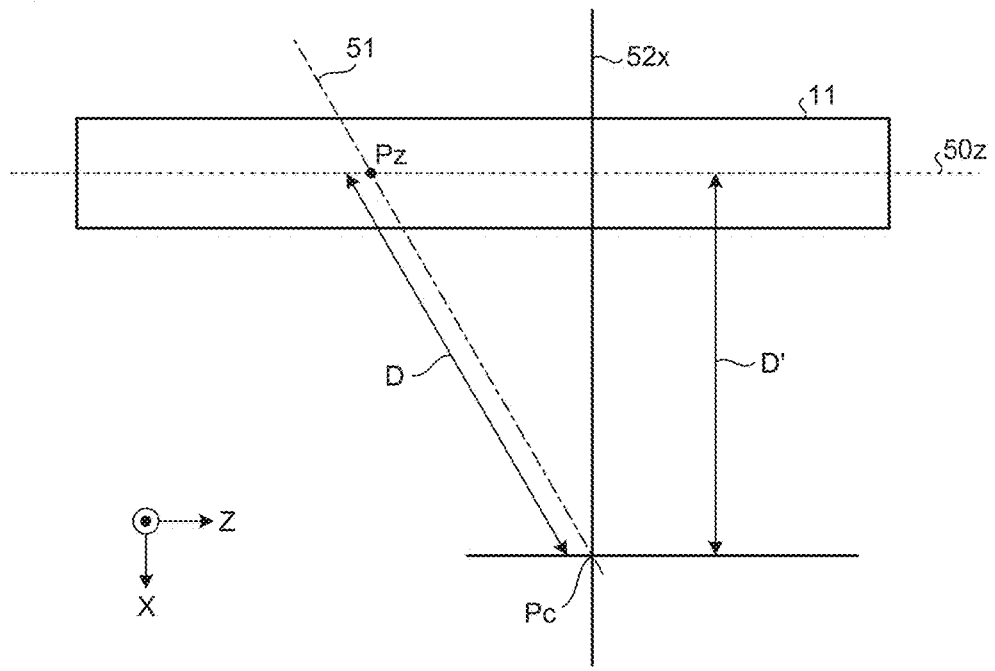

FIG.7
(a)
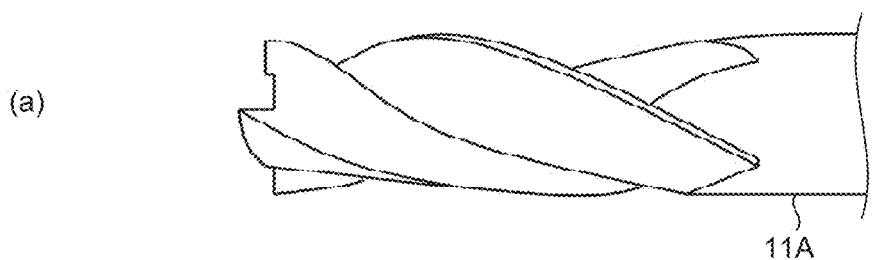
11A
(b)
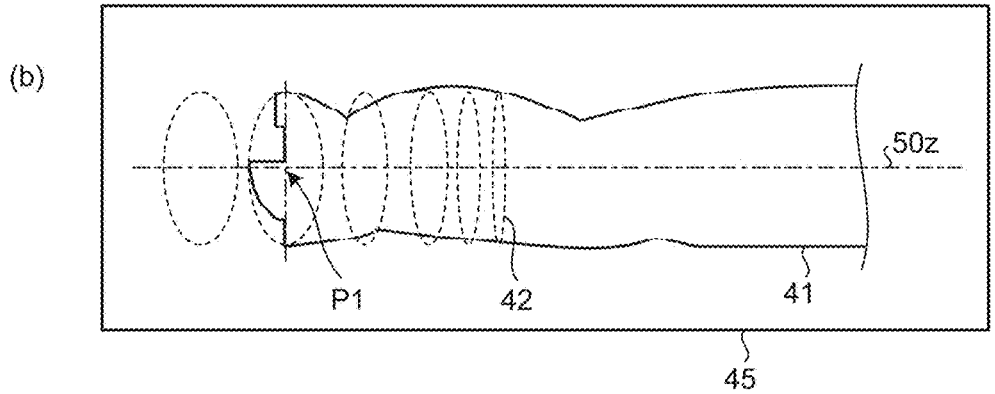
P1  42  41
50z
45

FIG.13
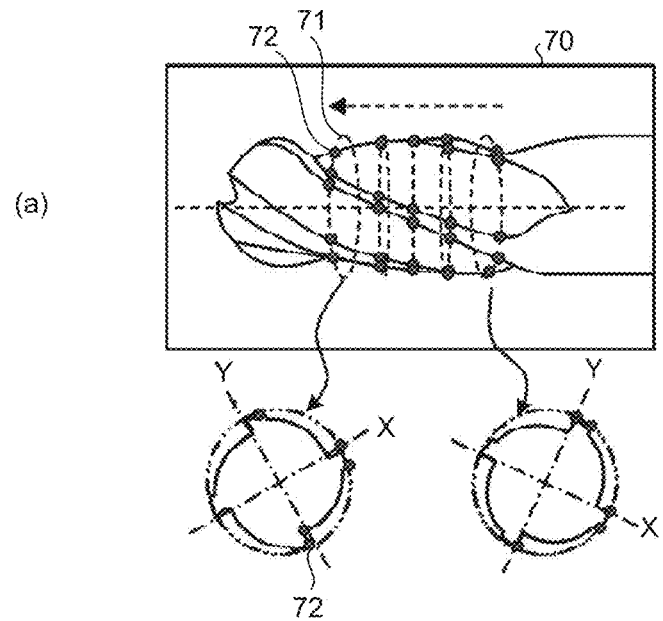
(a)
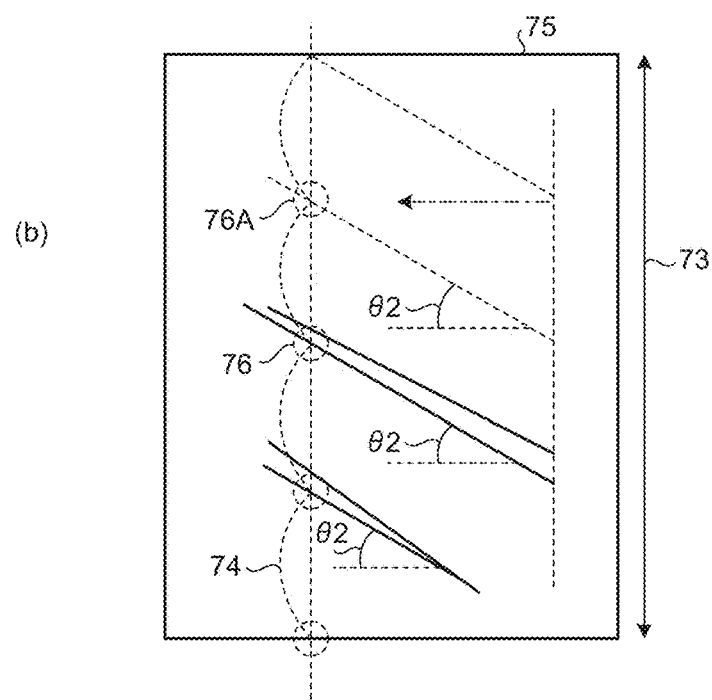
(b)

TOOL SHAPE MEASUREMENT DEVICE AND TOOL SHAPE MEASUREMENT METHOD

CROSS REFERENCE TO RELATED APPLICATIONS

This application is a National Stage of International Application No. PCT/JP2014/051566 filed Jan. 24, 2014, the contents of which are incorporated herein by reference in their entirety.

FIELD

The present invention relates to a tool shape measurement device which measures the shape of a tool, and a tool shape measurement method.

BACKGROUND

A first tool shape measurement device in the related art acquires a contour of a tool tip end portion by moving an optical non-contact sensor relative to a tool spindle. The first tool shape measurement device selects a correction table corresponding to the contour shape from a plurality of correction tables which are beforehand determined for the respective contour shapes of the tip end portion of the tool. In addition, the first tool shape measurement device obtains a correction amount of the tool dimensions on the basis of the correction table and obtains actual tool dimensions (the length and diameter of the tool) using the correction amount (for example, refer to Patent Literature 1).

In addition, a second tool shape measurement device in the related art includes a tool holding mechanism capable of rotating a tool about the center axis. The second tool shape measurement device fits a tool shape imaged while rotating the tool to a cylinder. In addition, the second tool shape measurement device determines a tool model on the basis of the result of pattern matching between the dimensions of the cylinder, the taken image, and tool models, and generates tool dimensional data using the tool model (for example, refer to Patent Literature 2).

CITATION LIST

Patent Literature

Patent Literature 1: Japanese Patent Application Laid-Open No. 2007-185771
Patent Literature 2: Japanese Patent Application Laid-Open No. 2006-284531

SUMMARY

Technical Problem

In the related art including the former and the latter, the tool dimensions are measured by using a movement mechanism for rotating or translating a sensor or tool. This is because the tool shape is complex and it is difficult to accurately measure the tool dimensions (diameter and length) from the appearance (tool contour or the like) obtained in a state were the tool and the sensor are fixed to each other. However, when the movement mechanism as in the related art including the former and the latter is used, there is a problem of an increase in costs and installation spaces.

The present invention has been achieved in view of the above and an object of the present invention is to provide a tool shape measurement device capable of measuring tool dimensions with a simple configuration, and a tool shape measurement method.

Solution to Problem

In order to solve the above problem, and in order to attain the above object, a tool shape measurement device of the present invention includes: a contour detection unit that detects a tool contour from an image of a rotating tool that is taken; an axis direction calculation unit that calculates a tool axis direction that is an axis direction of the rotating tool on the basis of the tool contour; a tool diameter measurement unit that calculates an apparent tool diameter of the rotating tool on an imaging surface on the basis of a calibrated positional and postural relationship between an imaging device that takes the image and the rotating tool, the tool axis direction, and the tool contour; and a tool diameter correction unit that calculates a distance between the imaging device and the rotating tool using the tool axis direction, and corrects the apparent tool diameter to an actual tool diameter by correcting distortion in the tool contour on the basis of the distance.

Advantageous Effects of Invention

According to the present invention, an effect of enabling measurement of tool dimensions with a simple configuration is exhibited.

BRIEF DESCRIPTION OF DRAWINGS

FIG. 1 is a view illustrating a tool holding mechanism included in a tool shape measurement device according to a first embodiment.

FIG. 4 is a view for explaining a correction method of a tool diameter.

FIG. 7 is a view for explaining a process of fitting a primitive to a tool tip end portion.

FIG. 13 is a view for explaining a process of determining shape parameters.

DESCRIPTION OF EMBODIMENTS

Figure 2:
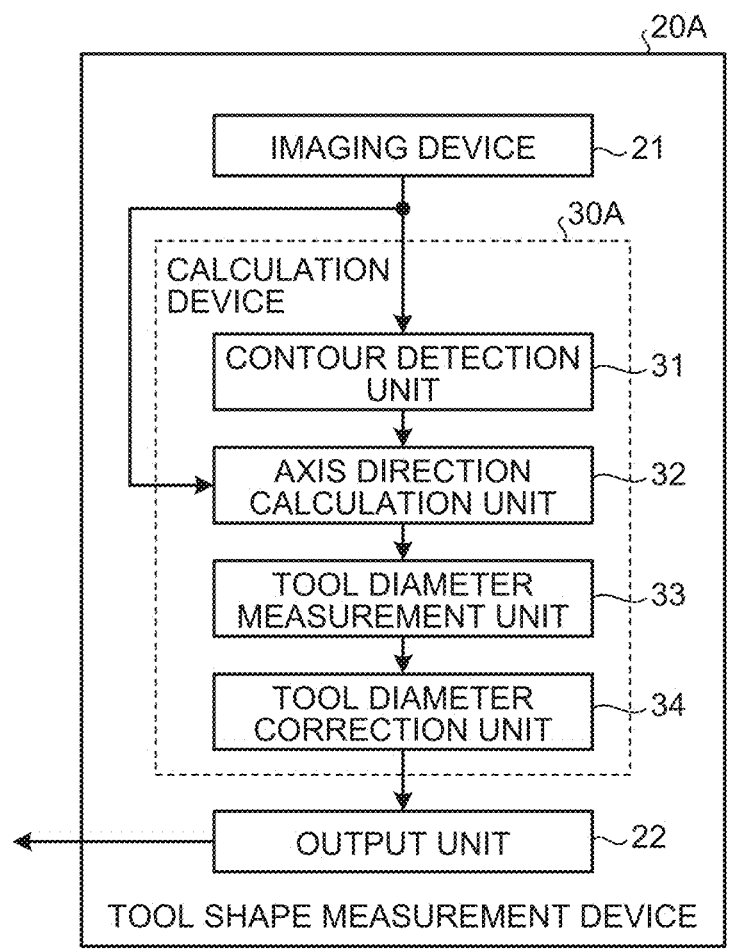
FIG. 2 is a block diagram illustrating the configuration of the tool shape measurement device according to the first embodiment.

Hereinafter, a tool shape measurement device and a tool shape measurement method according to embodiments of the present invention will be described in detail with reference to the drawings. The invention is not limited to the embodiments.

First Embodiment

FIG. 1 is a view illustrating a tool holding mechanism included in a tool shape measurement device according to a first embodiment. FIG. 1(a) illustrates a perspective view of a tool holding mechanism 12 and an imaging device 21 included in the tool shape measurement device. In addition, FIGS. 1(b) and 1(c) illustrate states during measurement of a tool. FIG. 1(b) is a perspective view of a rotating tool 11 and the imaging device 21, and FIG. 1(c) is a top view of the rotating tool 11 and the imaging device 21. In the present embodiment, a case in which an example of the tool is the rotating tool 11 is described. However, the tool may also be a tool other than the rotating tool 11.

The tool holding mechanism 12 is a device that holds the rotating tool 11 as a measurement object. The tool holding mechanism 12 is configured to enable the rotating tools 11 and a standard 16, which will be described later, to be detached therefrom. In addition, the tool holding mechanism 12 moves each of the rotating tools 11 to a position at which the corresponding rotating tool 11 can be imaged by the imaging device 21. Furthermore, the tool holding mechanism 12 moves the standard 16 to a position at which the standard 16 can be detected by the imaging device 21.

The imaging device 21 is disposed in a state of being fixed to the tool holding mechanism 12. The imaging device 21 images the rotating tools 11 held by the tool holding mechanism 12. In addition, the imaging device 21 detects the shape and pattern of the standard 16 held by the tool holding mechanism 12. As the tool holding mechanism 12, a tool magazine (a device capable of holding a plurality of rotating tools 11 that are used) or the like included in a machine tool may also be used. In this case, it is unnecessary to add a new imaging device (mechanism).

The standard 16 is attached to the tool holding mechanism 12 when calibration data, which will be described later, is generated. The calibration data is data calibrated by using the standard 16, and includes (1) a positional and postural relationship between the imaging device 21 and the tool holding mechanism 12 (the rotating tool 11) and (2) information of the scales of imaging device acquisition data and the actual space (dimensional ratio). The tool shape measurement device of the present embodiment measures the shape and dimensions of the rotating tool 11 using a calibrated positional and postural relationship and calibrated scale information.

The standard 16 is configured by using a plate-like member having a substantially planar shape. The standard 16 is attached to the tool holding mechanism 12 so that a single principal surface (the upper surface of the plate-like member) included in the standard 16 is on a plane including a straight line that passes through the axis (tool axis 50z) of the rotating tool 11 in a case where the rotating tool 11 is attached. In other words, the standard 16 has a reference plane including the straight line that passes through the tool axis 50z. A regular pattern such as a check pattern is attached to the reference surface (the plane including the tool axis 50z) of the standard 16 so as to allow the standard 16 to be easily treated as a known object. Accordingly, a calibration process can be simplified.

As illustrated in FIGS. 1(b) and 1(c), the imaging device 21 is disposed so that the tool axis 50z of the rotating tool 11 attached to the tool holding mechanism 12 is perpendicular to an imaging direction (optical axis 52x). The tool holding mechanism 12 moves a first rotating tool 11 to the front (imaging position) of the imaging device 21 in order to measure the tool shape of the first rotating tool 11, and moves a second rotating tool 11 to the front of the imaging device 21 in order to measure the tool shape of the second rotating tool 11. In addition, the tool holding mechanism 12 moves the standard 16 to the front of the imaging device 21 in order to detect the pattern and the like of the standard 16 (during the calibration process).

In the present embodiment, a case where a tool axis direction is a Z direction, the imaging direction of the imaging device 21 is an X direction, and a direction perpendicular to both the tool axis direction and the imaging direction is a Y direction (for example, a vertical direction) will be described.

FIG. 2 is a block diagram illustrating the configuration of the tool shape measurement device according to the first embodiment. A tool shape measurement device 20A according to the first embodiment includes the imaging device 21, a calculation device 30A, and an output unit 22. Although the tool shape measurement device 20A includes the tool holding mechanism 12, the illustration of the tool holding mechanism 12 is omitted in FIG. 2.

The imaging device 21 takes an image of the rotating tool 11 held by the tool holding mechanism 12 and inputs the taken image (imaged tool data) to the calculation device 30A. In addition, the imaging device 21 detects the shape and pattern of the standard 16 and generates calibration data using the detected shape and pattern. The imaging device 21 inputs the generated calibration data to the calculation device 30A.

The calculation device 30A is a computer or the like that calculates the tool shape of the rotating tool 11. The calculation device 30A of the present embodiment performs various operations using the contour of the tool of the rotating tool 11, the calibration data, and the like.

The calculation device 30A includes a contour detection unit 31, an axis direction calculation unit 32, a tool diameter measurement unit 33, and a tool diameter correction unit 34. The imaging device 21 inputs the image of the rotating tool 11 to the contour detection unit 31, and inputs the calibration data to the axis direction calculation unit 32.

The contour detection unit 31 detects the contour of the rotating tool 11 (hereinafter, referred to as a tool contour) on the basis of the image of the rotating tool 11 taken by the imaging device 21. For example, in a case were the contour detection unit 31 detects the tool contour from an image taken by a visible camera, a light source is installed on the rear surface of the rotating tool 11 when viewed from the imaging device 21. In addition, the contour detection unit 31 detects the tool contour using the difference in the brightness between pixels in which the rotating tool 11 is imaged and pixels in which the light source is imaged, from the taken image.

Otherwise, the contour detection unit 31 may also detect the tool contour using a background image in this case, the contour detection unit 31 beforehand acquires the background image in a state in which the rotating tool 11 is installed on the tool holding mechanism. 12. The contour detection unit 31 detects the tool contour by subtracting the background image from the taken image of the rotating tool 11. The contour detection unit 31 transmits the detected tool contour to the axis direction calculation unit 32.

The axis direction calculation unit 32 calculates the tool axis direction which is the axis direction of the rotating tool 11. The contour line of a cylindrical portion of the rotating tool 11 excluding effective blades is imaged as two straight lines in two-dimensional scan data. Therefore, the axis direction calculation unit 32 regards a set of points having the same distant to the two straight lines as the tool axis $50z$ on the imaging plane. In addition, the axis direction calculation unit 32 converts the two-dimensional coordinates of the points that represent the tool axis $50z$ into three-dimensional coordinates using the calibration data (the positional and postural relationship) acquired beforehand. Furthermore, the axis direction calculation unit 32 calculates the three-dimensional direction (the tool axis direction) of the tool axis $50z$ on the basis of the set of the three-dimensional coordinates (points). The axis direction calculation unit 32 transmits the calibration data, the tool contour, and the calculated tool axis direction to the tool diameter measurement unit 33.

The tool diameter measurement unit 33 measures the tool diameter (diameter) of the rotating tool 11 using the tool contour, the tool axis direction, and the calibration data (the positional and postural relationship and the scale information). The tool diameter is the shortest distance between the tool contour on the upper side of the taken image and the tool contour on the lower side thereof. Therefore, the tool diameter is calculated as the length of a line segment that connects two points on the tool contours that intersect when scanning in a direction perpendicular to the tool axis direction from the points on the tool axis $50z$ in the taken image. The tool diameter measurement unit 33 converts the two points on the tool contours into three-dimensional coordinates using the calibration data (the scale information), thereby obtaining the tool diameter at the scale of the actual space. The tool diameter measurement unit 33 transmits the tool diameter and the tool contours to the tool diameter correction unit 34.

The tool diameter correction unit 34 corrects a dimensional error in the tool diameter. Specifically, the tool diameter correction unit 34 corrects a dimensional error caused by a distortion of the contour of the image for the tool diameter (an apparent tool diameter on the imaged screen) transmitted from the tool diameter measurement unit 33.

The rotating tool 11 is imaged to be distorted to be thicker than an actual rotating tool 11. In other words, the tool contour on the taken image acquired by the imaging device 21 is distorted to be thicker than the contour of the actual rotating tool 11. Therefore, the length (the tool diameter on the image) of a line segment that connects two points on the tool contour obtained by the tool diameter measurement unit 33 is different from an actual tool diameter.

Accordingly, the tool diameter correction unit 34 of the present embodiment estimates a contour distortion, and corrects the tool diameter using the estimated contour distortion amount, thereby reducing a measurement error in the tool diameter. The tool diameter correction unit 34 transmits the tool diameter (actual tool diameter) in which the dimensional error is corrected to the output unit 22. The output unit 22 outputs the tool diameter in which the dimensional error is corrected to an external device such as a machine tool (for example, an NC machine tool) or a database. In addition, the imaging device 21 may be configured to be separated from the tool shape measurement device 20A. Furthermore, the tool holding mechanism 12 may be configured to be separated from the tool shape measurement device 20A.

Figure 3:
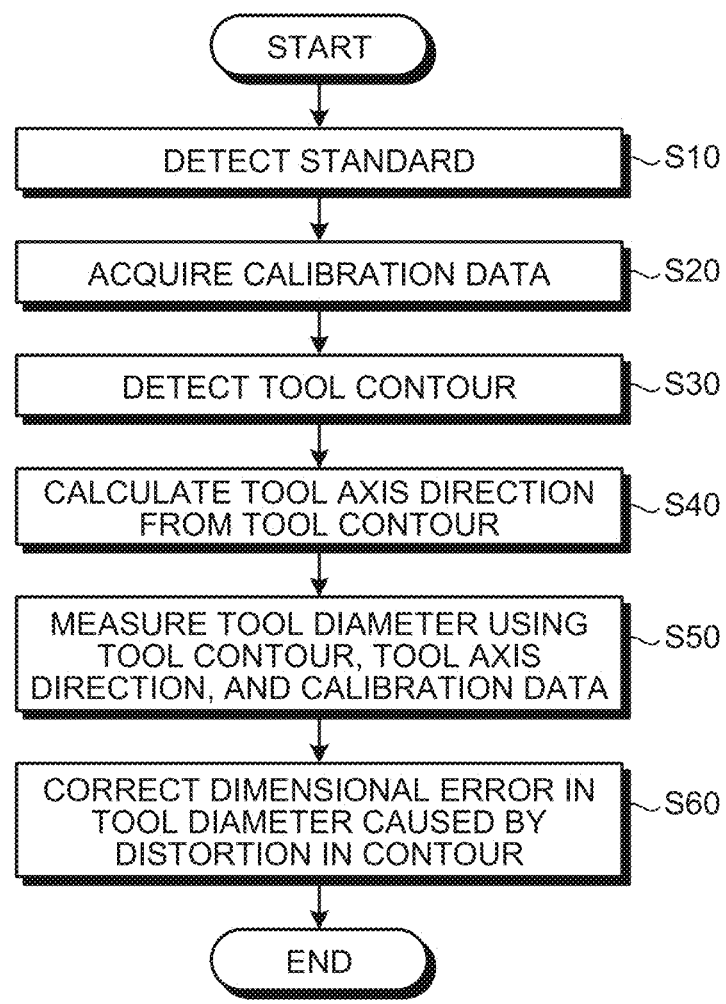
FIG. 3 is a flowchart illustrating a processing order of the tool shape measurement device according to the first embodiment.

Next, a processing order of the tool shape measurement device 20A will be described. FIG. 3 is a flowchart illustrating the processing order of the tool shape measurement device according to the first embodiment. In the present embodiment, the tool shape measurement device 20A beforehand calibrates the positional and postural relationship between the imaging device 21 and the tool holding mechanism 12, and the information regarding the scales of the imaging device acquisition data and the actual space, using the standard 16. At this time, as the imaging device 21, the visible camera which enables two-dimensional space scanning, or the like is used.

In order to calibrate the positional and postural relationship and the scale information, the standard 16 is attached to the tool holding mechanism 12. Accordingly, the standard 16 is disposed so that the plane (principal surface) of the standard 16 becomes a plane that passes through the tool axis. The imaging device 21 detects a known shape and pattern by detecting the standard 16 (the shape and pattern of the standard 16) (Step S10). The imaging device 21 acquires a positional and postural relationship and scale information relative to the standard 16 by detecting the known shape and pattern.

The imaging device 21 regards the position and posture with respect to the principal surface of the standard 16 as the position and posture of the standard 16, and generates the positional and postural relationship of calibration data. In addition, the imaging device 21 generates the ratio between the scale of the pattern of the standard 16 acquired by the imaging device 21 and the scale of the pattern in the actual space, as the scale information of the calibration data. Dimensional conversion using the ratio corresponds to conversion of the length of each pixel on the image into the unit of mm or the like in a case where the imaging device 21 is the visible camera.

The calibration data can be obtained as a conversion table or the like which represents the correspondence relationship between points on the imaging plane and points on the planes in a three-dimensional space. Here, the relative postures of the imaging device 21 and the standard 16 are affected by the depth of field of the imaging device 21. Therefore, it is preferable that the imaging device 21 is designed to allow the optical axis of the imaging device 21 to be perpendicular to the reference plane (the plane including the tool axis $50z$) of the standard 16.

When the imaging device 21 acquires the calibration data on the basis of the shape and pattern of the standard 16 (Step S20), the imaging device 21 inputs the calibration data to the axis direction calculation unit 32. Otherwise, the calibration data may also be generated by the calculation device 30A. In this case, the calibration data is generated by, for example, the axis direction calculation unit 32 or the like.

After the generation of the calibration data is completed, shape measurement of each of the rotating tools 11 is started. The contour detection unit 31 detects the tool contour on the basis of the image of the rotating tool 11 imaged by the imaging device 21 (Step S30). The contour detection unit 31 transmits the detected tool contour to the axis direction calculation unit 32.

The axis direction calculation unit 32 calculates the tool axis direction of the rotating tool 11 on the basis of the calibration data and the tool contour (Step S40). In addition, the axis direction calculation unit 32 transmits the calibration data, the tool contour, and the calculated tool axis direction to the tool diameter measurement unit 33.

The tool diameter measurement unit 33 measures the tool diameter of the rotating tool 11 using the tool contour, the tool axis direction, and the calibration data (the positional and postural relationship between the imaging device 21 and the rotating tool 11) (Step S50). In addition, the tool diameter measurement unit 33 transmits the tool contour and the tool diameter to the tool diameter correction unit 34.

Thereafter, the tool diameter correction unit 34 corrects the distortion in the tool contour (image) transmitted from the tool diameter measurement unit 33. Specifically, the tool diameter correction unit 34 corrects the dimensional error caused by the distortion of the contour of the image for the tool diameter transmitted from the tool diameter measurement unit 33 (Step S60). The tool diameter corrected by the tool diameter correction unit 34 is output to the external device from the output unit 22 as tool data of the rotating tool 11.

A correction method of the tool diameter will be described. FIG. 4 is a view for explaining the correction method of the tool diameter. FIG. 4(a) illustrates a tool section in a plane which includes a line segment that connects an optical center Pc of the imaging device 21 and a point Pz on the tool axis 50z and is perpendicular to the tool axis 50z. FIG. 4(b) is a top view of the rotating tool 11.

In a case where a tool portion to be measured is a cylinder, the section is generally an ellipse. FIG. 4(a) illustrates the shape of an ellipse in a case where the rotating tool 11 is cut by a cutting surface 51 directed from the imaging device 21 toward the rotating tool 11.

In a case where the tool axis 50z is perpendicular to the optical axis 52x of the imaging device 21, the length Lb of the minor axis of the ellipse is the same as the tool radius r of the rotating tool 11. Here, the tool radius r is the actual radius of the rotating tool 11.

The length La of the major axis of the ellipse is expressed by the following Expression (1) by using the shortest distance (the distance between the imaging device 21 and the rotating tool 11) D' from the tool axis 50z to the optical center Pc, and the distance D from the center (point Pz) of the ellipse to the optical center Pc.

[Expression 1]

$$a = \frac{D}{D'} r \quad (1)$$

In addition, a straight line directed to a point $P_0(x_0, y_0)$ on the ellipse shown as the tool contour on the imaging surface from the optical center Pc is expressed by the following Expression (2) using the tool radius r' on the imaging surface. Here, the tool radius r' is the apparent radius on the imaging surface.

[Expression 2]

$$y = -\frac{r'}{D} x + r' \quad (2)$$

The expression of the straight line shown in Expression (2) is the same as that of the tangent of the ellipse, which passes through (D, 0) and has the point $P_0(x_0, y_0)$ as the point of contact. The slope dy/dx of the tangent of the ellipse is expressed by the following Expression (3) by differentiating the equation of the ellipse with respect to x. Therefore, the following Expression (4) is established.

[Expression 3]

$$\frac{dy}{dx} = -\frac{b^2 x}{a^2 y} \quad (3)$$

[Expression 4]

$$-\frac{b^2 x}{a^2 y} = -\frac{r'}{D} \quad (4)$$

By putting Expression (4) in Expression (2), the coordinate point $P_0(x_0, y_0)$ of the point of contact of the tangent can be expressed by the following Expression (5). By putting Expression (5) in the equation of the ellipse, the true tool radius r of the rotating tool 11 can be expressed by the following Expression (6).

[Expression 5]

$$x_0 = \frac{Dr'^2}{D'^2 + r'^2} \quad (5)$$

$$y_0 = \frac{D'^2 r'}{D'^2 + r'^2}$$

[Expression 6]

$$r = \frac{\sqrt{D'^2 r'^4 + D'^4 r'^2}}{D'^2 + r'^2} \quad (6)$$

In Expression (6), the appearance (the tool radius r' on the imaging surface) of the rotating tool 11 on the imaging surface depends on only the tool radius r and the shortest distance D' between the optical center Pc and the tool axis 50z. Here, by calculating the shortest distance D' between the optical center Pc and the tool axis 50z from the tool axis 50z obtained by the axis direction calculation unit 32, the tool diameter can be measured.

In a case where the tool axis 50z is not perpendicular to the optical axis, the depth of the tool axis 50z with respect to the imaging surface changes, and thus the size of the tool contour on the imaging surface also changes. Here, in addition to the correction using the above Expression (6), correction as in the following Expression (7) in which the depth of the tool axis 50z is considered may also be performed. In Expression (7), with respect to the shortest distance D' between the optical center Pc and the tool axis 50z, the ratio between the shortest distance D' and the distance Dp between the imaging surface and the center of the ellipse is considered.

[Expression 7]

$$r = \frac{D_p}{D'} \frac{\sqrt{D'^2 r'^4 + D'^4 r'^2}}{D'^2 + r'^2} \quad (7)$$

The output unit 22 outputs the tool diameter in which the dimensional error is corrected to the database (storage device) as the tool data. Accordingly, the database regarding the tool diameters of the rotating tools 11 is created. The database may be disposed inside the machine tool, or may also be disposed outside the machine tool. Furthermore, the database may also be disposed inside or outside the tool shape measurement device 20A.

In a case where the database is disposed outside the tool shape measurement device 20A, the tool data is transmitted to the database using a data communication unit. In this case, the database may be shared by a plurality of machine tools. When the database is shared, there is an advantage that a number of rotating tools 11 included in machine tools can be unitarily managed. In addition, by comparing tool data measured in the past to the current tool data, the degree of deterioration such as wear of the rotating tool 11 may be determined. Furthermore, loads on the rotating tool 11 depending on processing conditions can be estimated from the correlation between the degree of deterioration and use history, and thus the time for replacing the rotating tool 11 can be accurately known.

According to the first embodiment described above, by using the tool contour extracted from the image of the rotating tool 11 and the calibration data acquired beforehand, the tool axis direction and the tool diameter can be easily measured. In addition, since the dimensions of the rotating tool 11 are corrected on the basis of the estimated contour distortion, the measurement error in the dimensions that occurs as the rotating tool 11 is imaged to be distorted to the thick in the tool diameter direction can be reduced. Accordingly, a mechanism for translating or rotating a sensor or tool, which is necessary in the related art, becomes unnecessary. Therefore, the tool dimensions can be measured with a simple configuration. In addition, costs for the measurement of the tool shape can be reduced, and a space for the installation area of the device can be reduced.

Second Embodiment

Next, a second embodiment of the invention will be described with reference to FIGS. 5 to 8. In the second embodiment, a tool shape measurement device 20B, which will be described later, fits a primitive such as a circle, sphere, or cone to the contour of the tool tip end portion and projects the primitive onto an imaging surface. When the primitive is projected onto the imaging surface, the tool shape measurement device 20B corrects the slope or scale of the primitive so as to achieve the same appearance as the section of an actual primitive by using the tool axis direction and the calibration data. In addition, the tool shape measurement device 20B measures the tool tip end position of the rotating tool 11 using the projected primitive, and calculates the tool length of the rotating tool 11 on the basis of the tool tip end position.

Figure 5:
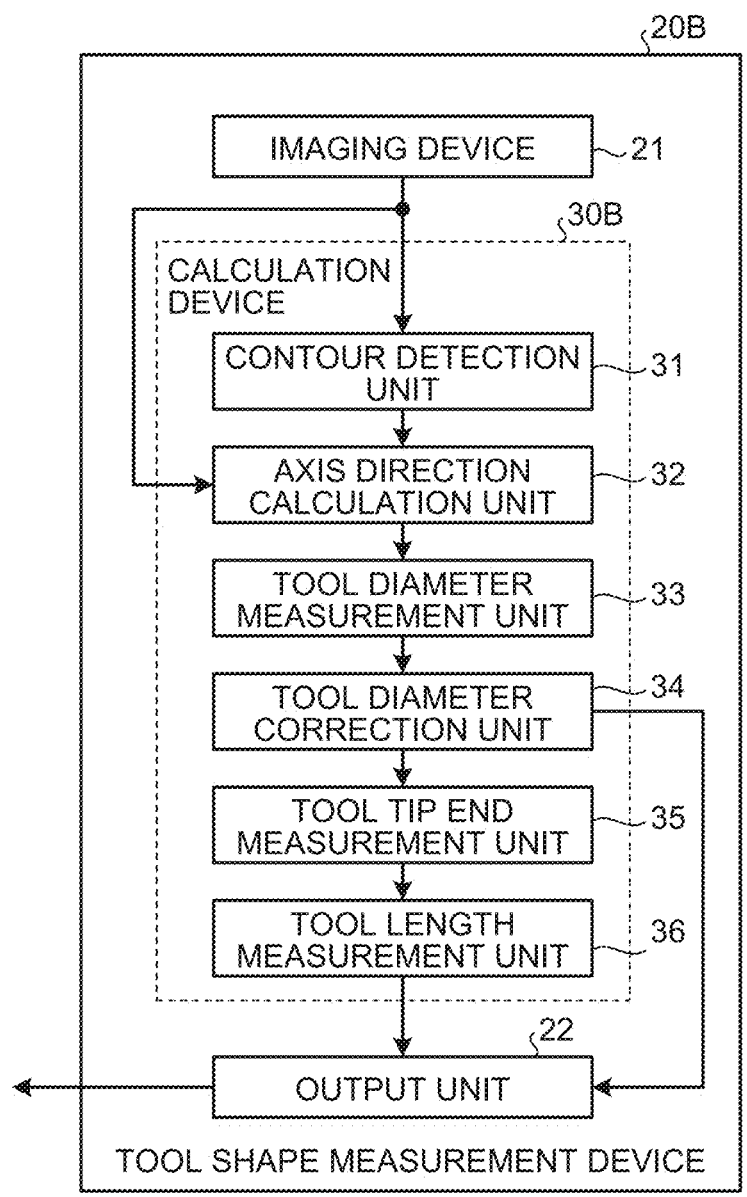
FIG. 5 is a block diagram illustrating the configuration of a tool shape measurement device according to a second embodiment.

FIG. 5 is a block diagram illustrating the configuration of the tool shape measurement device according to the second embodiment. The tool shape measurement device 20B according to the second embodiment includes the imaging device 21, a calculation device 30B, and the output unit 22.

Like constituent elements which achieve the same functions as those of the tool shape measurement device 20A of the first embodiment illustrated in FIG. 2 among the constituent elements in FIG. 5 are denoted by like reference numerals, and overlapping description will be omitted.

The calculation device 30B of the present embodiment includes the contour detection unit 31, the axis direction calculation unit 32, the tool diameter measurement unit 33, the tool diameter correction unit 34, a tool tip end measurement unit 35, and a tool length measurement unit 36.

In the present embodiment, the tool diameter measurement unit 33 transmits the tool contour, the tool axis direction, the calibration data, and the tool diameter to the tool diameter correction unit 34. In addition, the tool diameter correction unit 34 transmits the tool contour, the tool axis direction, the calibration data, and a corrected tool diameter to the tool tip end measurement unit 35.

The tool tip end measurement unit 35 measures the tip end position of the rotating tool 11 (hereinafter, referred to as a tool tip end position) and the shape thereof (tip end shape) using the tool contour, the tool axis direction, the calibration data, and the corrected tool diameter. The tool tip end measurement unit 35 of the present embodiment measures the tool tip end position by fitting the primitive such as a circle, sphere, or cone to the contour of the tip end portion of the rotating tool 11. The tool tip end measurement unit 35 transmits the calibration data and the measured tool tip end position to the tool length measurement unit 36.

The tool length measurement unit 36 measures the tool length of the rotating tool 11 using the tool tip end position and the calibration data. The calibration data includes the positional and postural relationship between the tool holding mechanism 12 and the imaging device 21. Therefore, the tool length measurement unit 36 calculates the tool tip end position with respect to the tool holding mechanism 12, that is, the tool length using the calibration data. The tool length measurement unit 36 transmits the measured tool length to the output unit 22. The output unit 22 outputs the tool length and the tool diameter in which a dimensional error is corrected to the external device.

Figure 6:
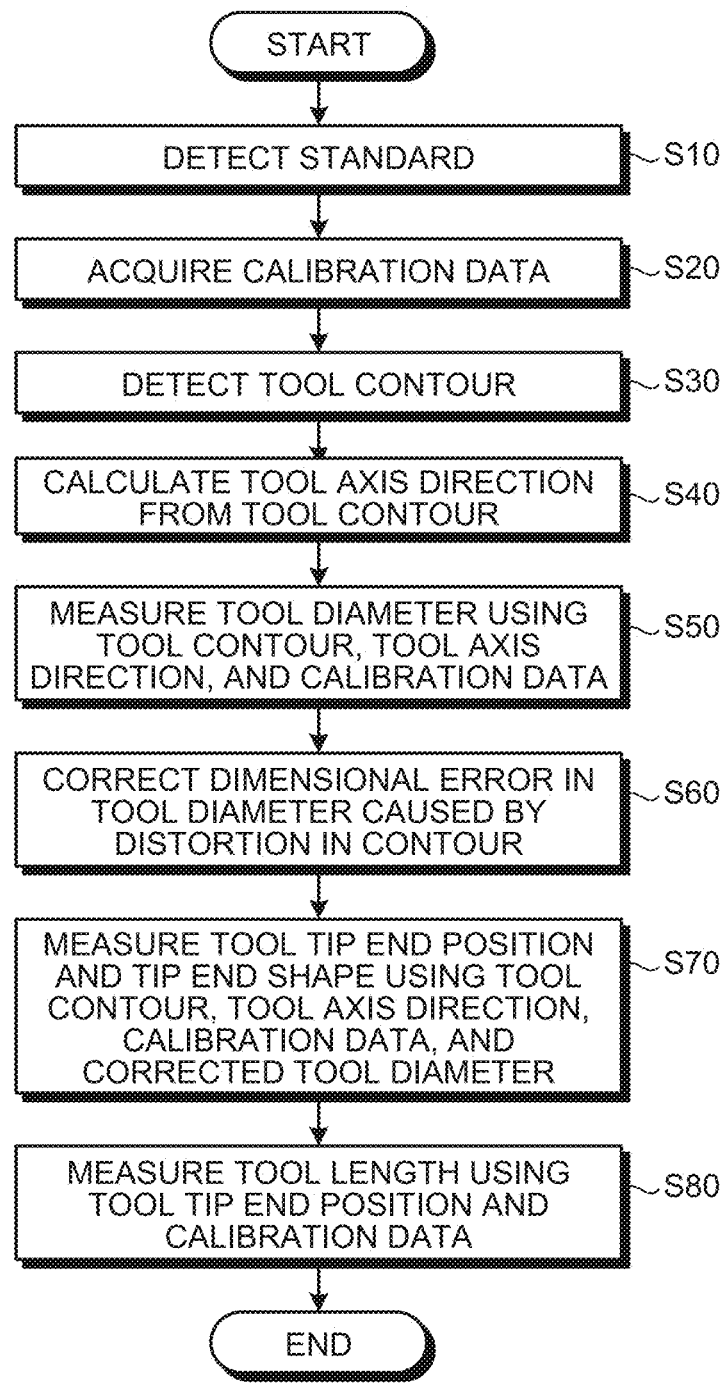
FIG. 6 is a flowchart illustrating a processing order of the tool shape measurement device according to the second embodiment.

Next, a processing order of the tool shape measurement device 20B will be described. FIG. 6 is a flowchart illustrating the processing order of the tool shape measurement device according to the second embodiment. In addition, the description of the same process as that of the tool shape measurement device 20A according to the first embodiment described with reference to FIG. 3 will be omitted.

The tool shape measurement device 20B calculates the corrected tool diameter in the same processing order as that of the tool shape measurement device 20A (Steps S10 to S60). At this time, the tool diameter measurement unit 33 transmits the tool contour, the tool axis direction, the calibration data, and the tool diameter to the tool diameter correction unit 34. In addition, the tool diameter correction unit 34 transmits the tool contour, the tool axis direction, the calibration data, and the corrected tool diameter to the tool tip end measurement unit 35. The tool diameter correction unit 34 transmits the corrected tool diameter to the output unit 22.

The tool tip end measurement unit 35 measures the tip end position and the tip end shape of the rotating tool 11 using the tool contour, the tool axis direction, the calibration data, and the corrected tool diameter (Step S70). At this time, the tool tip end measurement unit 35 measures the tool tip end position by fitting the primitive such as a circle, sphere, or cone to the contour of the tip end portion of the rotating tool 11.

The tool tip end measurement unit 35 fits the primitive such as a circle, sphere, or cone to the contour of the tool tip end portion using the fact that there are many primitives including a circle, a sphere, and the like that approximate the section of the tip end of the rotating tool 11. The tool tip end measurement unit 35 selects an appropriate primitive to be fitted for the tip end shape of the rotating body of the rotating tool 11. In the primitive selection, a worker may determine the primitive to be fitted or the type of the rotating tool 11, or the tool tip end measurement unit 35 may select the most appropriate primitive by fitting a plurality of primitives to the contour of the tool tip end portion obtained by the contour detection unit 31.

Similar to the contour, the tool tip end portion may also be imaged to be distorted. Therefore, a dimensional error therein is preferably corrected. The tool shape measurement device 20B enables the measurement of dimensions excluding the effect of distortion by reproducing distortion that occurs on the imaging surface when the primitive is fitted to the tool contour.

In a case where the section of the tool tip end portion approximates a circle (an end mill with square ends or the like), the tool tip end measurement unit 35 projects the circle of the tool diameter (the section of the rotating tool 11) measured by the tool diameter measurement unit 33 and the tool diameter correction unit 34 onto each position in the tool axis 50z on the imaging surface.

Figure 8:
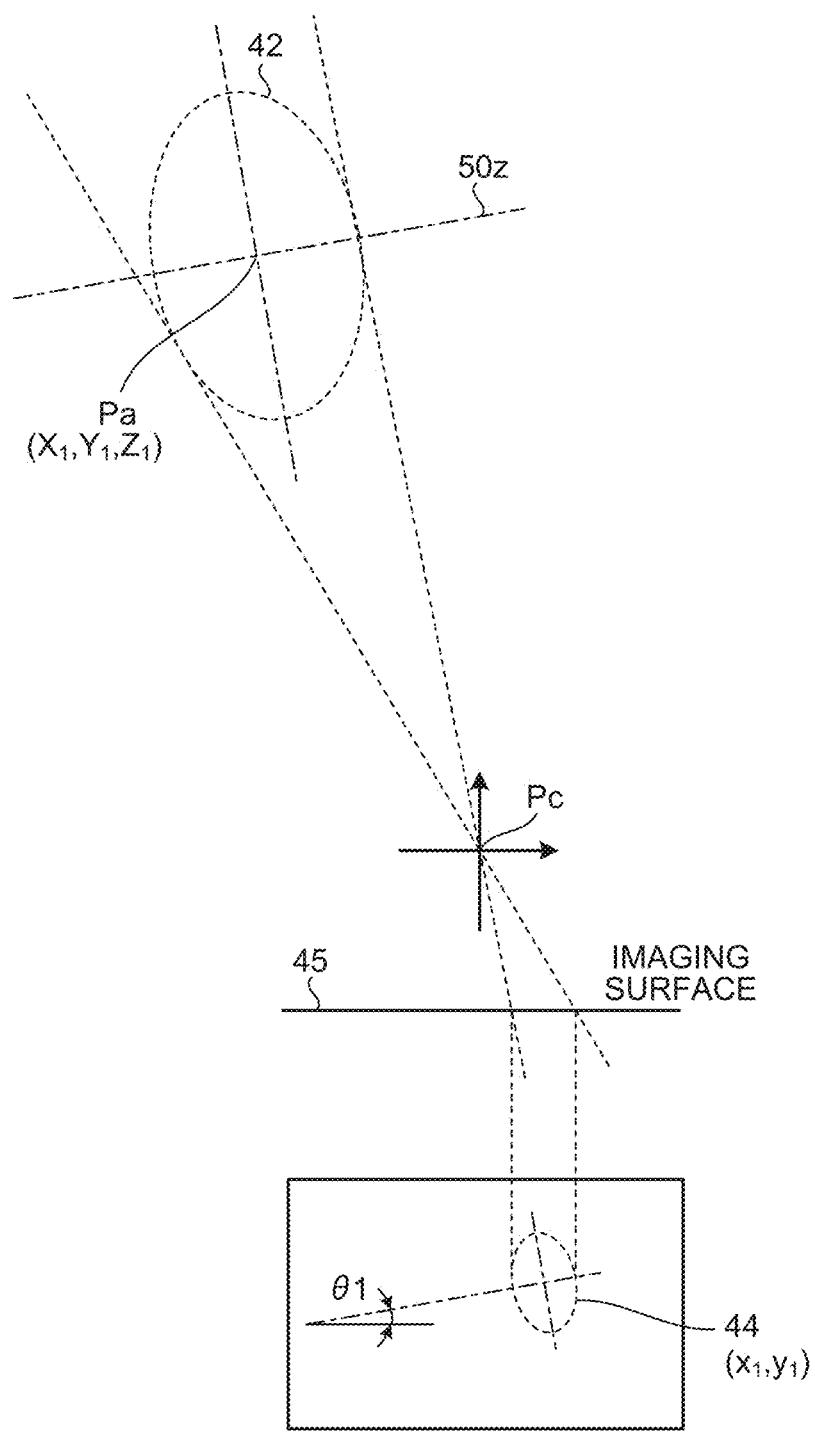
FIG. 8 is a view for explaining a process of projecting the primitive onto an imaging surface.

FIG. 7 is a view for explaining a process of fitting the primitive to the tool tip end portion. FIG. 8 is a view for explaining a process of projecting the primitive onto the imaging surface. FIG. 7(a) illustrates a rotating tool 11A as an example of the rotating tool 11. FIG. 7(b) illustrates a state in which the rotating tool 11A illustrated in FIG. 7(a) is projected onto an imaging surface 45.

When the primitive is projected onto the imaging surface 45, the tool tip end measurement unit 35 adjusts the slope or scale to achieve an appearance in a case here the section of the primitive is actually present, using the tool axis direction (tool axis angle θ1) and the calibration data. Here, the primitive is a circle 42 (a circle on the tool axis 50z) having Pa $(X_1, Y_1, Z_1)$ as the center. By adjusting the slope and scale, the tool tip end measurement unit 35 can reproduce distortion on the imaging surface 45. A circle 44 having $(x_1, y_1)$ as the center projected onto the imaging surface 45 generally becomes an ellipse, and the ratio between the major axis and the minor axis of the ellipse decreases as the ellipse is projected at a position further away from the optical axis 52x.

When the projected ellipse (the circle 42) is fitted to a contour 41 of the primitive, the tool tip end measurement unit 35 uses only a semicircular section that is present in the tool tip end direction with respect to the center of the ellipse. In addition, the tool tip end measurement unit 35 determines the center of the ellipse when the semicircular section touches the entirety or a portion of the contour of the tool tip end portion as a tool tip end position P1.

In general, the contour of the tool tip end portion has a shape including complex uneven portions and is inscribed in the contour of the rotating body of the tool. For example, as illustrated in FIG. 7(b), the contour of the tool tip end portion of the primitive is inscribed in the contour 41 of the primitive.

Therefore, the position of the primitive when the primitive touches the contour of the tool tip end portion and is at the farthest position in the tool tip end direction from the tool holding mechanism 12 is determined as the tool tip end position P1, such that the effect of the contour distortion in the image can be excluded.

The tool tip end measurement unit 35 may fit the tool tip end portion to the contour in the same method as the method of fitting the circle even regarding the other primitives such as a sphere (applied to an end mill with ball ends or the like) or a cone (applied to a drill or the like).

During the calculation of the tool tip end position, an appropriate offset for the fitted primitive may also be added to the tool tip end position. In a case where the primitive is a circle, the tool tip end measurement unit 35 sets the offset of the tool tip end position to zero. In a case where the primitive is a sphere, the tool tip end measurement unit 35 calculates a position to which the radius of the sphere (the same length as the tool diameter) is added in the tool axis direction, as the tool tip end position. In a case where the primitive is a cone, the tool tip end measurement unit 35 calculates a position to which the height of the cone is added in the tool axis direction, as the tool tip end position.

The tool tip end measurement unit 35 transmits the tip end shape, the calibration data, and the measured tool tip end position to the tool length measurement unit 36. The tool length measurement unit 36 measures the tool length of the rotating tool 11A using the tool tip end position and the calibration data. The tool length measurement unit 36 calculates the tool tip end position (the tool length) with respect to the tool holding mechanism 12 using the positional and postural relationship between the tool holding mechanism 12 and the imaging device 21, which is included in the calibration data (Step S80). The tool length measurement unit 36 transmits the tip end shape and the measured tool length to the output unit 22. The output unit 22 outputs the tip end shape, the tool length, and the tool diameter in which a dimensional error is corrected to the external device as tool data.

As described above, according to the second embodiment, since the tool tip end position is measured by using the primitive, the tool length can be measured by excluding factors in the dimensional error such as the distortion in the image caused by the contour of the tool tip end portion and the complex uneven shapes of the tool tip end portion. Accordingly, a mechanism for translating or rotating a sensor or tool, which is necessary in the related art, becomes unnecessary. Therefore, the tool dimensions can be measured with a simple configuration.

Third Embodiment

Next, a third embodiment of the invention will be described with reference to FIGS. 9 and 10. In the third embodiment, a tool shape measurement device 20C, which will be described later, extracts information of a primitive corresponding to the detected tool contour from contour information registered beforehand. In addition, the tool shape measurement device 20C measures the shape of the tool tip end portion using the extracted primitive information.

Figure 9:
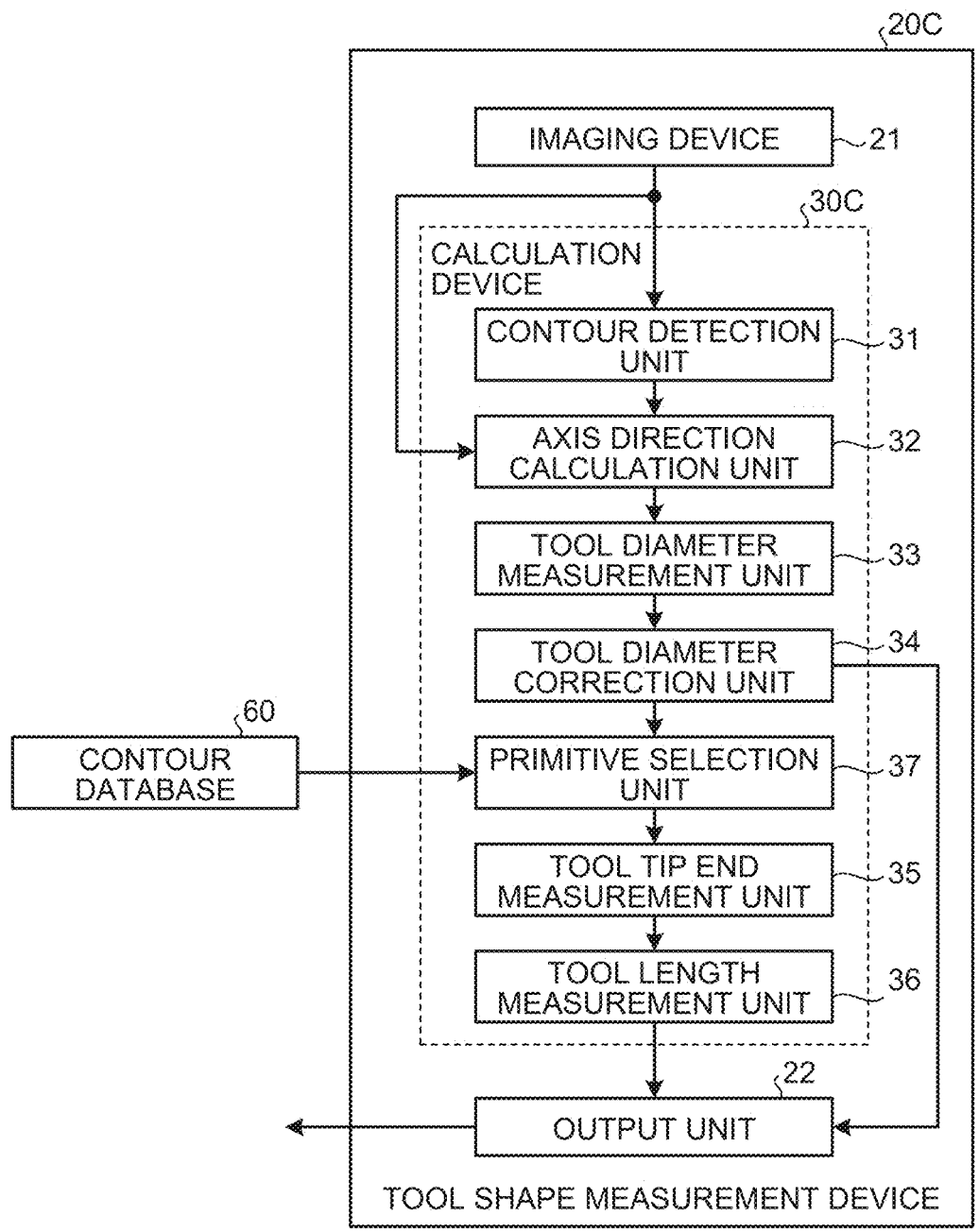
FIG. 9 is a block diagram illustrating the configuration of a tool shape measurement device according to a third embodiment.
Figure 10:
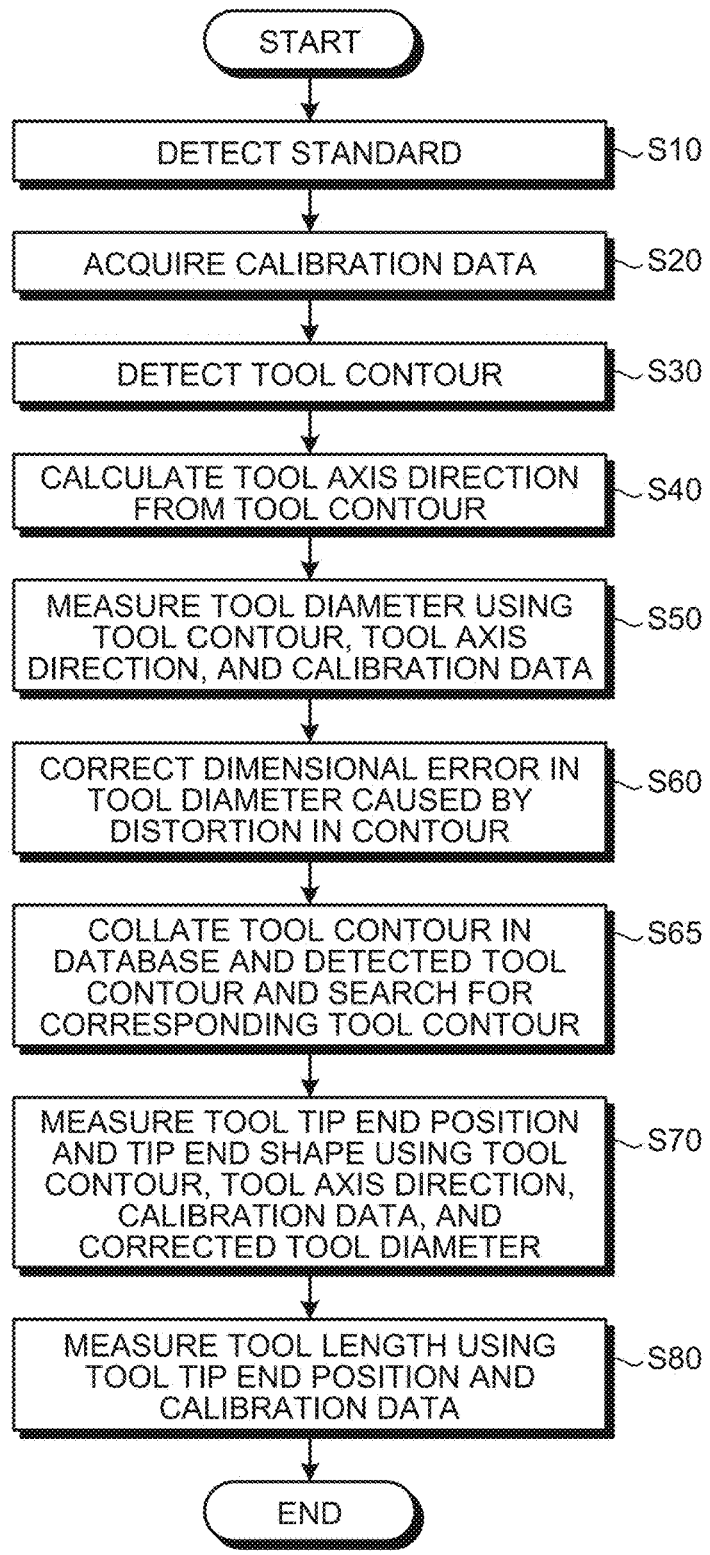
FIG. 10 is a flowchart illustrating a processing order of the tool shape measurement device according to the third embodiment.

FIG. 9 is a block diagram illustrating the configuration of the tool shape measurement device according to the third embodiment. The tool shape measurement device 20C according to the third embodiment includes the imaging device 21, a calculation device 30C, and the output unit 22. Like constituent elements which achieve the same functions as those of the tool shape measurement device 20B of the second embodiment illustrated in FIG. 5 among the constituent elements in FIG. 9 are denoted by like reference numerals, and overlapping description will be omitted.

The calculation device 30C of the present embodiment includes the contour detection unit 31, the axis direction calculation unit 32, the tool diameter measurement unit 33, the tool diameter correction unit the tool tip end measurement unit 35, the tool length measurement unit 36, and a primitive selection unit 37.

In the present embodiment, the tool diameter measurement unit 33 transmits the tool contour, the tool axis direction, the calibration data, and the tool diameter to the tool diameter correction unit 34. In addition, the tool diameter correction unit 34 transmits the tool contour, the tool axis direction, the calibration data, and the corrected tool diameter to the primitive selection unit 37.

The primitive selection unit 37 is connected to a contour database 60. The contour database 60 stores contour information in which the tool contours of various tool tip end portions are associated with information of primitives which are the most appropriate for the tool contours. The contour information includes the tool contours of the rotating tool 11 in a case where the rotating tool 11 is viewed at various angles.

The primitive selection unit 37 collates the tool contour transmitted from the tool diameter correction unit (the tool contour detected by the contour detection unit 31) with the tool contours in the contour information. The primitive selection unit 37 searches the contour information for the tool contour corresponding to the detected tool contour. In addition, the primitive selection unit 37 extracts information corresponding to the detected tool contour (information of the primitive that is the most appropriate for the detected tool contour) from the contour information. Accordingly, the primitive selection unit 37 acquires information of the primitive fitted to the rotating tool 11 from the contour database 60. The primitive selection unit 37 transmits the tool contour, the tool axis direction, the calibration data, the corrected tool diameter, and the extracted primitive information to the tool tip end measurement unit 35.

The tool tip end measurement unit 35 measures the tool tip end position and the tip end shape of the rotating tool 11 using the tool contour, the tool axis direction, the calibration data, the corrected tool diameter, and the extracted primitive information. At this time, the tool tip end measurement unit 35 its the primitive extracted from the contour information to the contour of the tip end portion of the rotating tool 11. The tool tip end measurement unit 35 obtains the tool tip end position of the rotating tool 11 using the fitted primitive and obtains the tool length on the basis of the tool tip end position.

Next, a processing order of the tool shape measurement device 20C will be described. FIG. 10 is a flowchart illustrating the processing order of the tool shape measurement device according to the third embodiment. In addition, the description of the same process as that of the tool shape measurement device 20B according to the second embodiment described with reference to FIG. 6 will be omitted.

The tool shape measurement device 20C calculates the corrected tool diameter in the same processing order as those of the tool shape measurement devices 20A and 20B (Steps S10 to S60). At this time, the tool diameter measurement unit 33 transmits the tool contour, the tool axis direction, the calibration data, and the tool diameter to the tool diameter correction unit 34. In addition, the tool diameter correction unit 34 transmits the tool contour, the tool axis direction, the calibration data, and the corrected tool diameter to the primitive selection unit 37. The tool diameter correction unit 34 transmits the corrected tool diameter to the output unit 22.

The primitive selection unit 37 collates the tool contour detected by the contour detection unit 31 with the tool contours in the contour information, and searches the contour information for the tool contour corresponding to the detected tool contour (Step S65). In addition, the primitive selection unit 37 extracts information of the primitive corresponding to the detected tool contour from the contour information. Accordingly, the primitive selection unit 37 acquires information of the primitive fitted to the rotating tool 11 from the contour database 60.

The primitive selection unit 37 transmits the tool contour, the tool axis direction, the calibration data, the corrected tool diameter, and the extracted primitive information to the tool tip end measurement unit 35. The tool tip end measurement unit 35 measures the tool tip end position and the tip end shape of the rotating tool 11 using the tool contour, the tool axis direction, the calibration data, the corrected tool diameter, and the extracted primitive information (Step S70).

The tool tip end measurement unit 35 transmits the calibration data, the measured tool tip end position, and the tip end shape to the tool length measurement unit 36. The tool length measurement unit 36 measures the tool length of the rotating tool 11 using the tool tip end position and the calibration data (Step S80). The tool length measurement unit 36 transmits the tip end shape and the measured tool length to the output unit 22. The output unit 22 outputs the tip end shape, the tool length, and the tool diameter in which the dimensional error is corrected to the external device as the tool data.

As described above, according to the third. Embodiment, since the information of the primitive corresponding to the detected calculation device is extracted from contour information registered beforehand, the primitive which is the most similar to the tip end. Shape of the rotating tool 11 can be easily selected. Therefore, the accuracy of the measurement of the shape of the tip end shape portion can be enhanced.

Fourth Embodiment

Next, a fourth embodiment of the invention will be described with reference to FIGS. 11 to 13. In the fourth embodiment, a tool shape measurement device 20D, which will be described later, determines whether or not an edge that is appropriate for the conditions of an outer peripheral blade edge is the outer peripheral blade edge, and determines shape parameters (at least one of the number of blades, an effective blade length, and a helix angle) regarding the properties (performance) of the rotating tool 11 on the basis of the outer peripheral blade edge.

Figure 11:
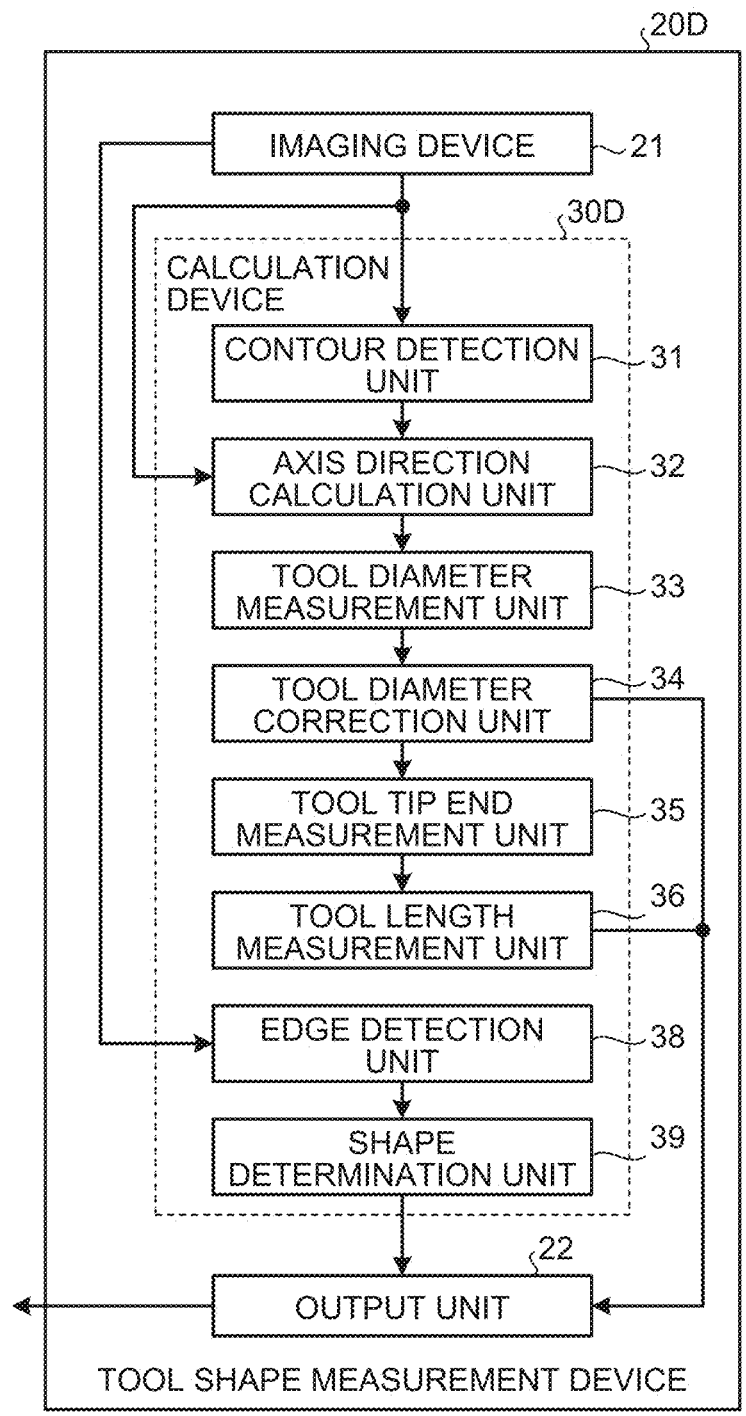
FIG. 11 is a block diagram illustrating the configuration of the tool shape measurement device according to a fourth embodiment.
Figure 12:
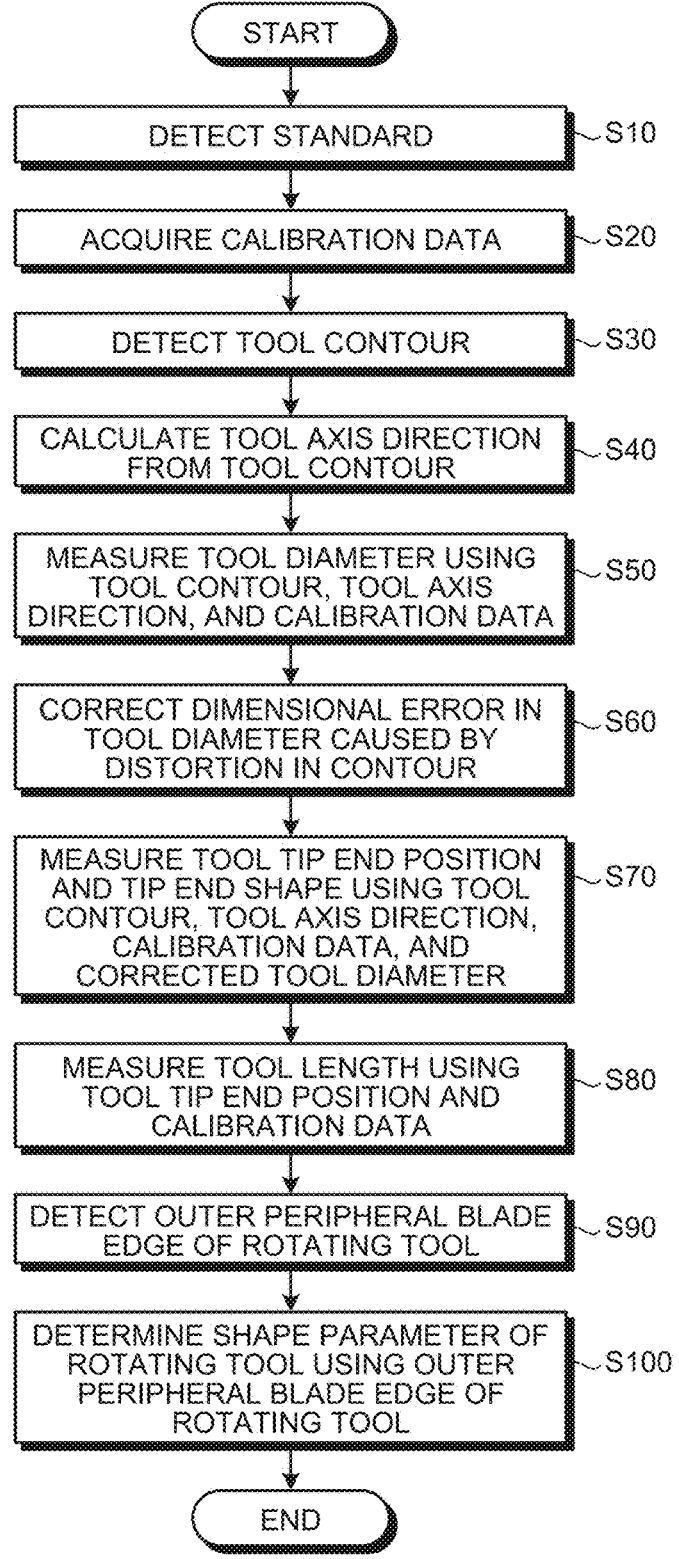
FIG. 12 is a flowchart illustrating a processing order of the tool shape measurement device according to the fourth embodiment.

FIG. 11 is a block diagram illustrating the configuration of the tool shape measurement device according to the fourth embodiment. The tool shape measurement device 20D according to the fourth embodiment includes the imaging device 21, a calculation device 30D, and the output unit 22. Like constituent elements which achieve the same functions as those of the tool shape measurement device 20B of the second embodiment illustrated in FIG. 5 among the constituent elements in FIG. 11 are denoted by like reference numerals, and overlapping description will be omitted.

The calculation device 30D of the present embodiment includes the contour detection unit 31, the axis direction calculation unit 32, the tool diameter measurement unit 33, the tool diameter correction unit 34, the tool tip end measurement unit 35, the tool length measurement unit 36, and an edge detection unit 38, and a shape determination unit 39. In the present embodiment, the imaging device 21 transmits the taken image of the rotating tool 11 to the axis direction calculation unit 32 and the edge detection unit 38.

The edge detection unit 38 detects the outer peripheral blade edge of the rotating tool 11 from the image obtained by the imaging device 21. The edge detection unit 38 transmits the detected outer peripheral blade edge to the shape determination unit 39. The shape determination unit 39 determines the shape parameters (the number of blades, an effective blade length, a helix angle, and the like) regarding the properties of the rotating tool 11 using the outer peripheral blade edge. The shape determination unit 39 determines the shape parameters on the basis of the characteristics of the shape of the outer peripheral blade edge (the continuity of the outer peripheral blade edge and the like). The shape determination unit 39 transmits the shape parameters to the output unit 22. The output unit 22 outputs the tip end shape, the tool diameter, the tool length, and the shape parameters to the external device or the like.

Next, a processing order of the tool shape measurement device 20D will be described. FIG. 12 is a flowchart illustrating the processing order of the tool shape measurement device according to the fourth embodiment. FIG. 13 is a view for explaining a process of determining the shape parameters in addition, the description of the same process as that of the tool shape measurement device 20B according to the second embodiment described with reference to FIG. 6 will be omitted.

The tool shape measurement device 20D calculates the corrected tool diameter in the same processing order as those of the tool shape measurement devices 20A and 20B (Steps S10 to S80). At this time, the imaging device 21 transmits the taken image of the rotating tool 11 to the contour detection unit 31 and the edge detection unit 38. In addition, the tool diameter correction unit 34 transmits the corrected tool diameter to the output unit 22, and the tool length measurement unit 36 transmits the measured tool length to the output unit 22.

The edge detection unit 38 detects the outer peripheral blade edge of the rotating tool 11 from an image 70 (see FIG. 13(a)) obtained by the imaging device 21. (Step S90). In the case of using the visible camera as the imaging device 21, a countermeasure of illuminating the rotating tool 11 with light to image the surface of the rotating tool 11 may also be employed even in a machine tool. Here, there may be cases where the outer peripheral blade edge is not easily detected depending on the posture of the rotating tool 11 or the direction of the light. Therefore, the outer peripheral blade edge may also be detected by using the result (images) of a plurality of imaging performed by illuminating the rotating tool 11 in a plurality of different directions. The edge detection unit 38 transmits the detected outer peripheral blade edge to the shape determination unit 39.

The shape determination unit 39 determines the shape parameters (at least one of the number of blades, an effective blade length, and a helix angle) of the rotating tool 11 using the outer peripheral blade edge detected by the edge detection unit 38 (Step S100).

Specifically, the shape determination unit 39 fits a circle 71 corresponding to the section of the tool diameter to the outer peripheral blade edge in the same process as that of the tool tip end measurement unit 35. In addition, the shape determination unit 39 extracts edges that intersect the fitted circle (that becomes an ellipse on the imaging surface) 71 as candidate points 72 of the outer peripheral blade, and calculates the three-dimensional coordinates to the candidate points 72. The three-dimensional coordinates calculated at this time are present on side surfaces of a cylinder having the same diameter as the tool diameter with the tool axis as the axis of the cylinder. The shape determination unit 39 performs the process of extracting the candidate points 72 of the outer peripheral blade a plurality of times while shifting its position along the tool axis, thereby acquiring the candidate points 72 of the outer peripheral blade edge which are continuously lined up on the side surface of the cylinder. The shape determination unit 39 obtains a group of the candidate points of the outer peripheral blade as straight lines or curves on a plane by developing the acquired side surfaces of the cylinder.

The edges detected by the edge detection unit 38 also include edges other than the outer peripheral blade. Therefore, the shape determination unit 39 determines which edge is included in the outer peripheral blade. The helix angle θ2 of the outer peripheral blade of the rotating tool 11 is constant, and the outer peripheral blade is inscribed the rotating body of the tool. Therefore, when the shape determination unit 39 develops the side surfaces of the cylinder on which the group of the candidate points of the outer peripheral blade are drawn, the edges of the outer peripheral blade are lined up as straight lines on a development diagram 75.

On the other hand, when the edge is an edge that is not included in the outer peripheral blade, the edge is regarded as being present on the side surfaces of the cylinder regardless of whether or not the edge is inscribed in the rotating body of the tool, and three-dimensional coordinates are calculated. Therefore, the edge is projected onto the development diagram 75 to be distorted. Here, the shape determination unit 39 excludes the points of the edges that are lined up on the curve on the development diagram 75 from the candidates of the outer peripheral blade edge. In other words, the shape determination unit 39 extracts the points of the edges that are lined up on the straight lines on the development diagram 75 as the candidate points of the outer peripheral blade edge.

Furthermore, as illustrated in FIG. 13(b), intervals at which outer peripheral blades 76 are present are constant in a circumferential direction, the intervals 74 have lengths obtained by equally dividing a circumferential length 73, and the helix angles θ2 of the outer peripheral blades 76 are equal to each other. Accordingly, the shape determination unit 39 can determine which straight line is the outer peripheral blade edge. The shape determination unit 39 extracts a combination of the straight lines that are the most appropriate for the conditions (the characteristics of the shape of the outer peripheral blade) from the development diagram 75 of the cylinder. On the basis of the extracted development diagram 75, the shape determination unit 39 determines the number of parts equally divided from the circumferential length 73 as the number of blades of the rotating tool 11, the slope of the straight lines as the helix angle θ2, and the length from a start point 76A at which the outer peripheral blade edge is detected to the tool tip end position as the effective blade length.

The shape determination unit 39 transmits the determined shape parameters (the number of blades, the effective blade length, and the helix angle) to the output unit 22. The output unit 22 outputs the tip end shape, the tool diameter, the tool length, and shape parameters to the external device or the like.

In addition, the tool shape measurement device 20D may also include the primitive selection unit 37. In this case, the tool shape measurement device 20D measures the shape of the tip end shape portion using the information of a primitive corresponding to the tool contour. In addition, the tool shape measurement device 20D may perform any one of the processes of Steps S90 and S100 and the processes of Steps S10 to S80.

As described above, according to the fourth embodiment, whether or not the edge which is appropriate for the conditions of the outer peripheral blade edge among the edges is the outer peripheral blade edge is determined, and thus the shape parameters (the number of blades, the effective blade length, and the helix angle) regarding the properties of the rotating tool 11 can be determined. In the related art, rotating tools having the same diameter and the same length are determined as the same tool, and rotating tools which are different only in the number of blades or only in the helix angle may not be determined. In the present embodiment, by determining the shape parameters of the rotating tool 11, the rotating tool 11 which has the same tool rotating body and has different shape parameters can be determined.

Fifth Embodiment

Next, a fifth embodiment of the invention will be described with reference to FIGS. 14 to 16. In the fifth embodiment, a tool shape measurement device 20E, which will be described later, determines the attached state of the rotating tool 11 on the basis of at least one pieces of information including the tool axis direction, the tool diameter, the tool length, and the shape parameters.

Figure 14:
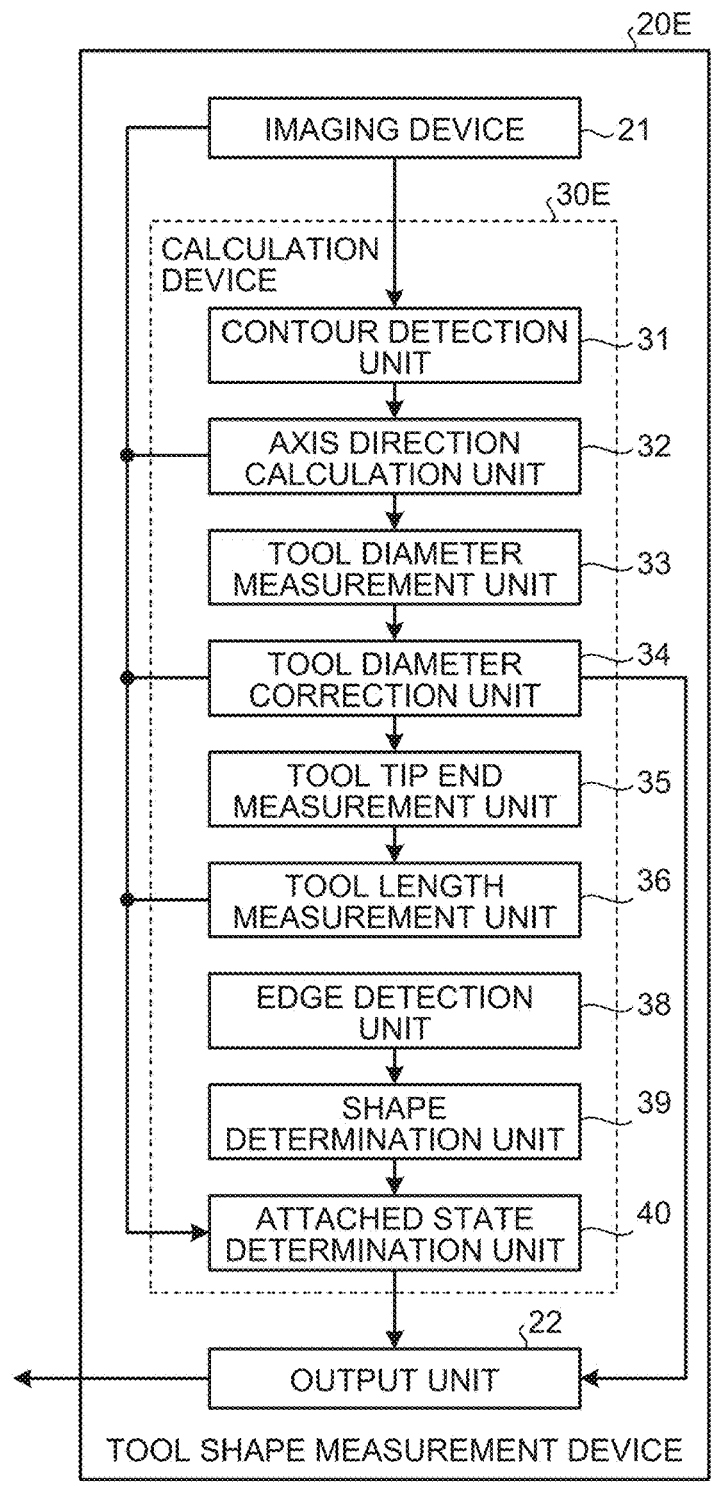
FIG. 14 is a block diagram illustrating the configuration of the tool shape measurement device according to a fifth embodiment.
Figure 15:
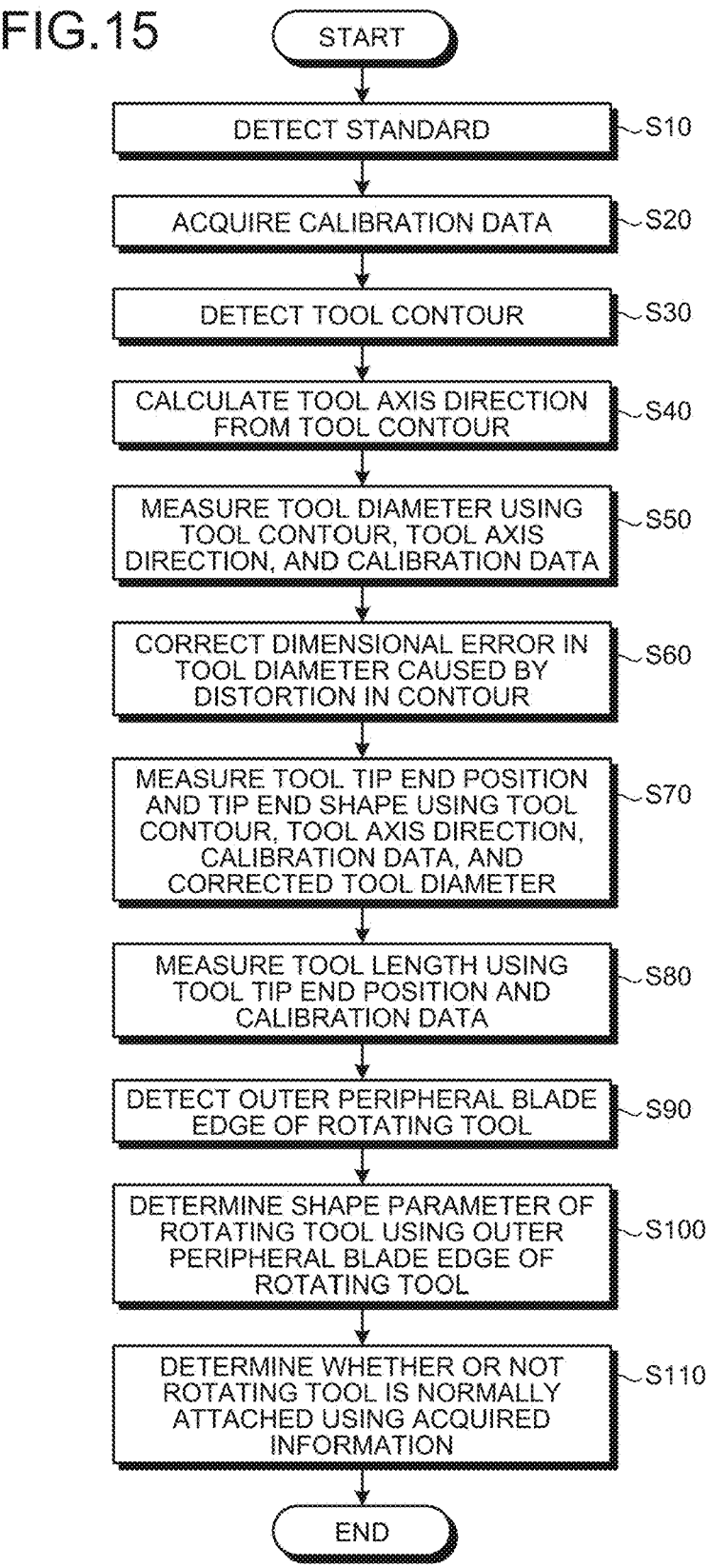
FIG. 15 is a flowchart illustrating a processing order of the tool shape measurement device according to the fifth embodiment.

FIG. 14 is a block diagram illustrating the configuration of the tool shape measurement device according to the fifth embodiment. The tool shape measurement device 20E according to the fifth embodiment includes the imaging device 21, a calculation device 30E, and the output unit 22. Like constituent elements which achieve the same functions as those of the tool shape measurement device 20D of the fourth embodiment illustrated in FIG. 11 among the constituent elements in FIG. 14 are denoted by like reference numerals, and overlapping description will be omitted.

The calculation device 30E of the present embodiment includes the contour detection unit 31, the axis direction calculation unit 32, the tool diameter measurement unit 33, the tool diameter correction unit 34, the tool tip end measurement unit 35, the tool length measurement unit 36, and the edge detection unit 38, and the shape determination unit 39, and an attached state determination unit 40.

In the present embodiment, the axis direction calculation unit 32 transmits the calculated tool axis direction to the attached state determination unit 40. In addition, the tool diameter correction unit 34 transmits the tool diameter in which the dimensional error is corrected to the attached state determination unit 40. The tool length measurement unit 36 transmits the measured tool length to the attached state determination unit 40. The shape determination unit 39 transmits the shape parameters to the attached state determination unit 40.

The attached state determination unit 40 determines the attached state of the rotating tool 11. Specifically, the attached state determination unit 40 determines whether or not the rotating tool 11 is normally attached on the basis of at least one pieces of information including the tool axis direction, the tool diameter, the tool length, and the shape parameters. Therefore, at least one pieces of information including the tool axis direction, the tool diameter, the tool length, and the shape parameters may be input to the attached state determination unit 40.

In a case where the tool axis direction is used, the attached state determination unit 40 determines whether or not the rotating tool 11 is obliquely attached by detecting a shift in the tool axis direction with respect to the tool holding mechanism 12.

In addition, in a case where any of the tool diameter, the tool length, and the shape parameters is used, the attached state determination unit 40 determines whether or not an appropriate rotating tool 11 for processing conditions (cutting width and depth, feed rate, and the like) is attached. In a method of determining the attached state, for example, processing conditions may be manually provided by a worker beforehand and the attached state determination unit 40 collates the processing conditions with the measurement results of the rotating tool 11 that is used. In addition, from the measurement results of the rotating tool 11, the cutting width and depth, the feed rate, and the like in the case of using the rotating tool 11 may be suggested for the worker, and determination of whether or not the selected rotating tool 11 is appropriate may be performed by the worker. In addition, any of the tool shape measurement devices 20A to 20D may include the attached state determination unit 40.

Next, a processing order of the tool shape measurement device 20E will be described. FIG. 15 is a flowchart illustrating the processing order of the tool shape measurement device according to the fifth embodiment. In addition, the description of the same process as that of the tool shape measurement device 20D according to the fourth embodiment described with reference to FIG. 12 will be omitted.

The tool shape measurement device 20E calculates the corrected tool diameter, the tool length, the tip end shape, and the like in the same processing order as that of the tool shape measurement device 20D (Steps S10 to S100). At this time, at least one of the axis direction calculation unit 32, the tool diameter correction unit the tool length measurement unit 36, and the shape determination unit 39 transmits information for the determination of the attached state of the rotating tool 11 to the attached state determination unit 40.

For example, the axis direction calculation unit 32 transmits the calculated tool axis direction to the attached state determination unit 40. In addition, the tool diameter correction unit 34 transmits the tool diameter in which the dimensional error is corrected to the attached state determination unit 40. The tool length measurement unit 36 transmits the measured tool length to the attached state determination unit 40. The shape determination unit 39 transmits the shape parameter to the attached state determination unit 40.

The attached state determination unit 40 determines whether or not the rotating tool 11 is normally attached, using the acquired information (at least one of the tool axis direction, the tool diameter in which the dimensional error is corrected, the tool length, and the shape parameters) (Step S110). The attached state determination unit 40 transmits the determination result of the attached state to the output unit 22. The output unit 22 outputs the determination result of the attached state, the tip end shape, the tool diameter, the tool length, and the shape parameter to the external device or the like.

Figure 16:
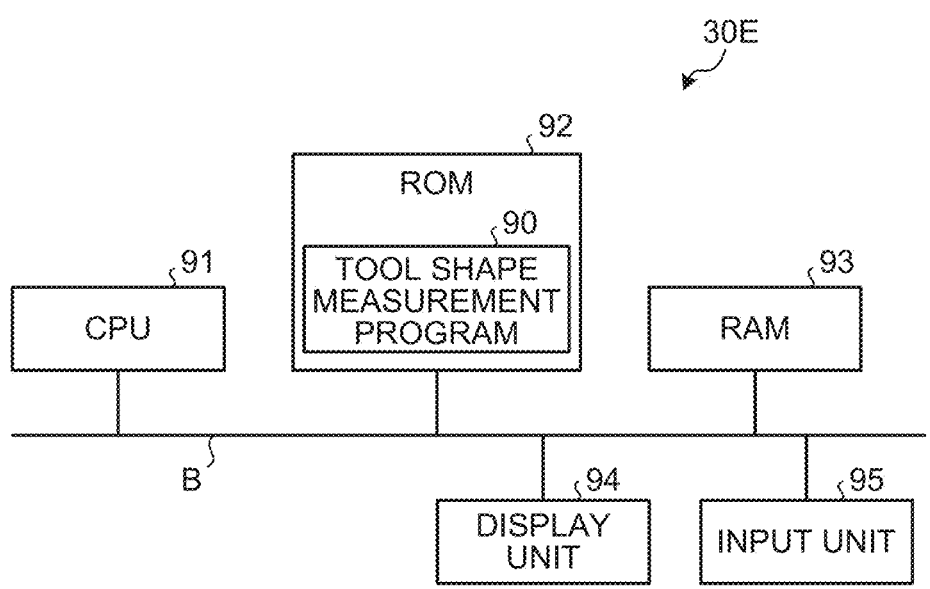
FIG. 16 is a view illustrating the hardware configuration of a calculation device according to the fifth embodiment.

FIG. 16 is a view illustrating the hardware configuration of the calculation device according to the fifth embodiment. The calculation device 30E includes a central processing unit (CPU) 91, a read only memory (ROM) 92, a random access memory (RAM) 93, a display unit 94, and an input unit 95. In the calculation device 30E, the CPU 91, the ROM 92, the RAM 93, the display unit 94, and the input unit 95 are connected via bus lines B.

The CPU 91 measures the tool shape using a tool shape measurement program 90 which is a computer program. The display unit 94 is a display device such as a liquid-crystal display monitor, and displays the contour of the rotating tool 11, the tool axis direction, the tool diameter before correction, the tool diameter after the correction, the tool tip end position, the tip end shape, the tool length, the shape parameters regarding the properties of the rotating tool 11, the attached state, the determination result of the attached state, and the like on the basis of an instruction from the CPU 91. The input unit 95 is configured to include a mouse or keyboard so as to input instruction information (parameters and the like necessary for the measurement of the tool shape) input from the outside by a user. The instruction information input to the input unit 95 is transmitted to the CPU 91.

The tool shape measurement program 90 is stored in the ROM 92 and is loaded on the RAM 93 via the bus lines B. The CPU 91 executes the tool shape measurement program 90 loaded on the RAM 93. Specifically, in the calculation device 30E, the CPU 91 reads the tool shape measurement program 90 from the ROM 92 according to the instruction input from the input unit 95 by the user and develops the tool shape measurement program 90 in a program storage region of the RAM 93 to execute various processes. The CPU 91 allows various types of data generated during the various processes to be temporarily stored in a data storage region formed in the RAM 93.

The tool shape measurement program 90 executed by the calculation device 30S has a module configuration including the contour detection unit 31, the axis direction calculation unit 32, the tool diameter measurement unit 33, the tool diameter correction unit 34, the tool tip end measurement unit 35, the tool length measurement unit 36, the edge detection unit 38, the shape determination unit 39, and the attached state determination unit 40, and these units are loaded on a main storage unit and are generated on the main storage unit.

The calculation devices 30A to 30D have the same hardware configuration as that of the calculation device 30S. The tool shape measurement program 90 executed by the calculation device 30A has a module configuration including the contour detection unit 31, the axis direction calculation unit 32, the tool diameter measurement unit 33, and the tool diameter correction unit 34.

The tool shape measurement program 90 executed by the calculation device 30B has a module configuration including the contour detection unit 31, the axis direction calculation unit 32, the tool diameter measurement unit 33, the tool diameter correction unit 34, the tool tip end measurement unit 35, and the tool length measurement unit 36.

The tool shape measurement program 90 executed by the calculation device 30C has a module configuration including the contour detection unit 31, the axis direction calculation unit 32, the tool diameter measurement unit 33, the tool diameter correction unit 34, the tool tip end measurement unit 35, the tool length measurement unit 36, and the primitive selection unit 37.

The tool shape measurement program 90 executed by the calculation device 30D has a module configuration including the contour detection unit 31, the axis direction calculation unit 32, the tool diameter measurement unit 33, the tool diameter correction unit 34, the tool tip end measurement unit 35, the tool length measurement unit 36, the edge detection unit 38, and the shape determination unit 39.

As described above, according to the fifth embodiment, since the attached state of the rotating tool 11 is determined by using at least one piece of information including the tool axis direction, the tool diameter, the tool length, and the shape parameters, whether or not the rotating tool 11 I normally attached, or whether or not a rotating tool 11 which fits for the purpose of use is attached may be determined. Accordingly, processing performed in a wrongly attached state can be prevented, and the rotating tool 11 or a workpiece can be prevented from being damaged. In addition, a mistake made by using a wrong rotating tool 11 which does not fit for the processing conditions postulated by the worker can be prevented.

INDUSTRIAL APPLICABILITY

As described above, the tool shape measurement device and the tool shape measurement method according to the present invention are appropriate for the measurement of the shape of a tool.

REFERENCE SIGNS LIST

11, 11A rotating tool, 12 tool holding mechanism, 16 standard, 20A to 20E tool shape measurement device, 21 imaging device, 30A to 30E calculation device, contour detection unit, 32 axis direction calculation unit, 33 tool diameter measurement unit, 34 tool diameter correction unit, 35 tool tip end measurement unit, 36 tool length measurement unit, 37 primitive selection unit, edge detection unit, 39 shape determination unit, 40 attached state determination unit, 50z tool axis, 52x optical axis, 60 contour database.

The invention claimed is:

1. A tool shape measurement device comprising:
a memory storing computer-executable instructions; and
a processor executing the stored instructions, which cause the processor to:
  detect a tool contour from an image of a rotating tool that is taken by an imaging device;
  calculate a tool axis direction that is an axis direction of the rotating tool based on the detected tool contour;
  calculate an apparent tool diameter of the rotating tool on an imaging surface based on a positional and postural relationship between the imaging device, the calculated tool axis direction, and the detected tool contour, the positional and postural relationship being calibrated beforehand;
  calculate a distance between the imaging device and the rotating tool using the tool axis direction, and
  correct the apparent tool diameter to an actual tool diameter by correcting distortion in the tool contour based on the calculated distance,
wherein the rotating tool is determined to be appropriate or not for processing conditions of a workpiece based on the corrected apparent tool diameter.

2. The tool shape measurement device according to claim 1,
wherein the stored instructions executed by the processor further cause the processor to calculate a shortest distance between an optical center of the imaging device and a tool axis of the rotating tool, and corrects the apparent tool diameter to the actual tool diameter using the shortest distance.

3. The tool shape measurement device according to claim 2,
wherein the stored instructions executed by the processor further cause the processor to correct the actual tool diameter by using a ratio between the shortest distance and a distance between the imaging surface and a center of the rotating tool.

4. The tool shape measurement device according to claim 1, wherein the stored instructions executed by the processor further cause the processor to:
measure a tip end position of the rotating tool by calculating a position and a shape of a primitive that is fitted to a three-dimensional appearance of a contour of a tip end portion of the rotating tool; and
measure a tool length of the rotating tool based on the tool contour and the tip end position.

5. The tool shape measurement device according to claim 4, wherein the stored instructions executed by the processor further cause the processor to selects a primitive corresponding to the contour of the tip end portion from among a plurality of tool contours stored in a database.

6. The tool shape measurement device according to claim 1, wherein the stored instructions executed by the processor further cause the processor to:
detect an outer peripheral blade edge of the rotating tool from the image; and
determine a shape parameter regarding a property of the rotating tool based on a characteristic of a shape of the outer peripheral blade edge.

7. The tool shape measurement device according to claim 6,
wherein the shape parameter includes at least one of the number of blades of the rotating tool, an effective blade length, and a helix angle.

8. The tool shape measurement device according to claim 4, wherein the stored instructions executed by the processor further cause the processor to determine an attached state of the rotating tool by using at least one of the tool axis direction, the actual tool diameter, and the tool length.

9. The tool shape measurement device according to claim 6, wherein the stored instructions executed by the processor further cause the processor to determine an attached state of the rotating tool by using at least one of the tool axis direction, the actual tool diameter, and the shape parameter.

10. A tool shape measurement method comprising:
detecting, by a processor, a tool contour from an image of a rotating tool that is taken by an imaging device;
calculating a tool axis direction that is an axis direction of the rotating tool based on the detected tool contour;
calculating an apparent tool diameter of the rotating tool on an imaging surface based on a positional and postural relationship between the imaging device and the rotating tool, the tool axis direction, and the tool contour, the positional and postural relationship being calibrated beforehand;
calculating a distance between the imaging device and the rotating tool using the calculated tool axis direction; and
correcting the apparent tool diameter to an actual tool diameter by correcting distortion in the tool contour based on the calculated distance,
wherein the rotating tool is determined to be appropriate or not for processing conditions of a workpiece based on the corrected apparent tool diameter.

11. The tool shape measurement device according to claim 1, wherein the stored instructions executed by the processor further cause the processor to obtain the image of the rotating tool at a fixed position with respect to the imaging device and determines the actual tool diameter using the obtained image of the rotating tool, which is a single image of the rotating tool.

12. The tool shape measurement device according to claim 1, wherein the actual tool diameter is determined without moving the imaging device or the tool with respect to each other to obtain a plurality of images.

13. The tool shape measurement device according to claim 1, wherein the axis direction is a z-axis dimensional direction and wherein the tool diameter is a shortest distance between the calculated tool contour on an upper side of the image and the calculated tool contour on a lower side thereof.

14. The tool shape measurement device according to claim 1, wherein the tool contour is distorted to be thicker than the rotating tool and wherein the calculated apparent tool diameter is converted from two points into a three-dimensional coordinates using calibration data.

15. The tool shape measurement device according to claim 1, further comprising a transceiver configured to transmit the actual tool diameter calculated by the processor to a numeric controller which positions and controls a machining tool comprising the rotating tool for machining a workpiece.

16. The tool shape measurement device according to claim 1, wherein the positional and postural relationship between the imaging device and a tool holding mechanism holding the rotating tool and a standard is calibrated beforehand using scale information obtained by using the standard.

17. The tool shape measurement device according to claim 1, wherein the stored instructions executed by the processor further cause the processor to correct the apparent tool diameter by using the following equation:

$$r = \frac{D_p}{D'} \frac{\sqrt{D'^2 r'^4 + D'^4 r'^2}}{D'^2 + r'^2}$$

wherein r' is an apparent tool radius on the imaging surface, D' is a shortest distance between an optical center Pc and a tool axis, Dp is a distance between the imaging surface and a center of an ellipse.

18. The tool shape measurement device according to claim 1, wherein the processor is further configured to:
determine whether or not the rotating tool is correctly attached based on the corrected apparent tool diameter, and
based on the determination that the rotating tool is correctly attached, process a workpiece with the rotating tool.

19. The tool shape measurement device according to claim 1, wherein the rotating tool processes a workpiece based on the processing conditions in response to the processor determining that the rotating tool is appropriate.

* * * * *